United States Patent
Ookubo et al.

(10) Patent No.: US 9,073,348 B2
(45) Date of Patent: Jul. 7, 2015

(54) MARKING APPARATUS FOR SPECTACLE LENSES AND METHOD OF PRINTING LAYOUT MARKS ON SPECTACLE LENSES

(75) Inventors: Shigeki Ookubo, Tokyo (JP); Shinichi Yokoyama, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 239 days.

(21) Appl. No.: 13/634,707

(22) PCT Filed: Mar. 31, 2011

(86) PCT No.: PCT/JP2011/058231
§ 371 (c)(1),
(2), (4) Date: Sep. 13, 2012

(87) PCT Pub. No.: WO2011/125844
PCT Pub. Date: Oct. 13, 2011

(65) Prior Publication Data
US 2013/0000499 A1    Jan. 3, 2013

(30) Foreign Application Priority Data

Mar. 31, 2010 (JP) ................ 2010/081699
Mar. 31, 2010 (JP) ................ 2010/081703

(51) Int. Cl.
*G06F 15/00* (2006.01)
*G06K 1/00* (2006.01)
(Continued)

(52) U.S. Cl.
CPC ............. *B41J 3/407* (2013.01); *B24B 13/0055* (2013.01); *B41J 11/002* (2013.01); *G02C 13/001* (2013.01)

(58) Field of Classification Search
CPC ..... B41J 3/407; B41J 11/002; B24B 13/0055; G06K 15/00; G06K 15/10

USPC ........................................ 358/1.1, 1.5, 526
See application file for complete search history.

(56) References Cited

U.S. PATENT DOCUMENTS

| 7,014,314 B1 * | 3/2006 | Kamata et al. ........... 351/159.66 |
| 2003/0063256 A1 | 4/2003 | Inuzuka |

(Continued)

FOREIGN PATENT DOCUMENTS

| JP | A-7-137248 | 5/1995 |
| JP | A-09-272198 | 10/1997 |

(Continued)

OTHER PUBLICATIONS

International Search Report issued in International Patent Application No. PCT/JP2011/058231 mailed May 31, 2011.

(Continued)

*Primary Examiner* — Douglas Tran
(74) *Attorney, Agent, or Firm* — Oliff PLC

(57) ABSTRACT

A marking apparatus for spectacle lenses includes a printing data generation device which generates printing data of a layout mark to be printed on the optical surface of a spectacle lens. The apparatus also includes a printing device implemented by an inkjet printer which prints the layout mark on the spectacle lens in cooperation with a conveyance device based on the printing data. The apparatus moreover includes a UV curing device which cures the ink printed on the spectacle lens. The printing data generation device includes a storage unit which stores image data of the layout mark, and printing condition data including a plurality of printing conditions each corresponding to the surface state of the spectacle lens, and a process unit which generates the printing data based on the image data and a printing condition selected from the plurality of printing conditions.

11 Claims, 16 Drawing Sheets

(51) Int. Cl.
*G06K 15/10* (2006.01)
*B41J 3/407* (2006.01)
*B24B 13/005* (2006.01)
*B41J 11/00* (2006.01)
*G02C 13/00* (2006.01)

(56) References Cited

U.S. PATENT DOCUMENTS

| | | |
|---|---|---|
| 2005/0134525 A1 | 6/2005 | Tanghe et al. |
| 2005/0200905 A1 | 9/2005 | Kimura |
| 2006/0023026 A1 | 2/2006 | Hoshino |
| 2006/0268085 A1 | 11/2006 | Konno |
| 2007/0091262 A1 | 4/2007 | Watanabe et al. |
| 2009/0295846 A1* | 12/2009 | Simke ............................. 347/2 |

FOREIGN PATENT DOCUMENTS

| | | |
|---|---|---|
| JP | A-10-282459 | 10/1998 |
| JP | A-2002-46046 | 2/2002 |
| JP | A-2002-292547 | 10/2002 |
| JP | A-2002-331739 | 11/2002 |
| JP | A-2003-107410 | 4/2003 |
| JP | A-2003-145747 | 5/2003 |
| JP | A-2004-17004 | 1/2004 |
| JP | A-2004-17546 | 1/2004 |
| JP | A-2004-347947 | 12/2004 |
| JP | A-2005-85211 | 3/2005 |
| JP | A-2005-104147 | 4/2005 |
| JP | A-2005-235329 | 9/2005 |
| JP | A-2005-313548 | 11/2005 |
| JP | A-2006-43945 | 2/2006 |
| JP | A-2006-240249 | 9/2006 |
| JP | A-2006-326983 | 12/2006 |
| JP | A-2007-222950 | 9/2007 |
| JP | A-2009-190297 | 8/2009 |
| JP | A-2009-221465 | 10/2009 |
| JP | A-2008-265024 | 11/2009 |

OTHER PUBLICATIONS

Jun. 10, 2014 Office Action issued in Japanese Patent Application No. 2012-509576.

Jan. 22, 2014 Office Action issued in Chinese Patent Application No. 201180018115.8 (with translation).

Dec. 17, 2013 Office Action issued in Japanese Patent Application No. 2012-509576.

* cited by examiner

201

201

201

201

MARKING APPARATUS FOR SPECTACLE LENSES AND METHOD OF PRINTING LAYOUT MARKS ON SPECTACLE LENSES

TECHNICAL FIELD

The present invention relates to a marking apparatus for spectacle lenses, and a method of printing layout marks on spectacle lenses, using an inkjet printer.

BACKGROUND ART

In a progressive-power spectacle lens, information necessary to edge a lens and inspect the optical performance of the lens is often temporarily printed on the optical surface of an uncut lens (a finished lens before edging), or an optically finished surface including the progressive surface of a semifinished lens.

Examples of the information to be printed include position indication marks (to be generically referred to as reference position indicators hereinafter) such as a processing reference point (fitting point), horizontal reference line, vertical reference line, distance portion measurement position (distance portion measurement reference point), near portion measurement position (near portion measurement reference point), and prism measurement reference point, indication marks (to be simply referred to as lens right or left indication marks hereinafter) indicating whether spectacle lenses (to be also simply referred to as lenses hereinafter) are right or left lenses, and indication marks (to be referred to as lens identification indication marks hereinafter) for identifying lenses, such as the lens product name, manufacturer's name, and blank name. An indicator formed by one or a plurality of combinations of these information will be referred to as a layout mark hereinafter.

FIG. 16 is a view illustrating an example of a left-eye progressive-power lens using an uncut lens having a layout mark formed on it. As for a layout mark on a progressive-power lens 110, it is generally printed on the front surface of the lens with white ink. The layout mark in this example is formed by a combination of horizontal reference lines 112A and 112E which pass through two permanent alignment reference marks 111A and 111B, respectively, on the progressive-power lens 110, a distance portion measurement position indication mark 113 indicating the position of a distance portion measurement reference point, a near portion measurement position indication mark 114 indicating the position of a near portion measurement reference point, a dot 115 indicating the position of a prism measurement reference point, an indication line 116 indicating the height of a fitting point, a lens right or left indication mark 117, a lens identification indication mark 118, and vertical reference lines 119A and 119E which pass through the prism measurement reference point. Note that the position of the fitting point in this example can be determined based on the intersection between the vertical reference lines 119A and 119B and the fitting point height position indication line 116.

Such a layout mark normally becomes unnecessary after edging, and is therefore printed on a lens using ink that can easily be removed using an organic solvent such as an alcohol.

As a conventional method of printing such a layout mark, it is a common practice to prepare a plate for each layout mark in advance, transfer ink from the plate onto a stamp, and further transfer the ink from the stamp onto the optical surface of a lens. However, in recent years, printing techniques which can cope with various layout marks by changing the discharge pattern using an inkjet printer have been proposed (see, for example, patent literatures 1 and 2).

A marking method described in patent literature 1 discharges hot-melt ink, which is thermally melted based on a pattern generated by a pattern generation unit, from an inkjet head onto the surface of a lens as minute liquid droplets to print, for example, a predetermined pattern.

A marking method described in patent literature 2 includes a pattern generation process of generating a layout pattern based on an inset amount and corridor length given by designating arbitrary numerical values, and prints a layout pattern generated in the pattern generation process on the printing surface of a lens using an inkjet printer.

RELATED ART LITERATURE

Patent Literature

Patent Literature 1: Japanese Patent Laid-Open No. 2003-145747

Patent Literature 2: Japanese Patent Laid-Open No. 2005-313548

DISCLOSURE OF INVENTION

Problem to be Solved by the Invention

To print using an inkjet printer, first, ink formed by minute liquid droplets is discharged from a printhead onto the optical surface of a lens to adhere it to this optical surface. The ink is then dried and cured to fix it to the lens. Marks are formed on a lens by adhering ink to the lens and curing the ink in this way. However, the optical surfaces of lens blanks to undergo marking are often coated with various coatings (for example, a hard coating, an antireflection coating, an antifouling coating (water stain preventive coating), an antistatic coating, an antifogging coating, and a UV coating). Therefore, the degree of adhesion of ink (the wettability for ink) and the degree of fixing of ink vary depending on the presence or absence of a coating and the type of coating, so problems are often posed due to unclear printing or ink traces remaining on the lens.

As in, for example, an antifouling coating with high water and oil repellencies, if the contact angle between a lens and a liquid droplet is large, the diameter of the liquid droplet becomes small, so marks are formed at a relatively low density. Also, in a coating having a small contact angle between a lens and a liquid droplet (for example, a hard coating, an AR coating, or an antifouling coating with relatively low water and oil repellencies), adjacent liquid droplets often aggregate upon coming into contact with each other. Moreover, when marks are formed on a hard coating or a blank surface with no coating, ink traces often remain on the lens even after the marks are wiped away.

The present invention has been made in order to solve the above-mentioned conventional problems and meet given requirements. It is an object of the present invention to provide an apparatus and method for printing layout marks on spectacle lenses under appropriate printing conditions in accordance with, for example, the presence or absence of a coating, the type of coating, and the type of lens.

Means of Solution to the Problem

In order to achieve the above-mentioned object, according to the present invention, there is provided a marking apparatus for spectacle lenses, comprising a lens holding device which holds a spectacle lens, a conveyance device which moves the lens holding device horizontally and vertically, an image processing device which senses and processes an image of the spectacle lens, a height measuring device which measures a height of the spectacle lens, a printing data generation device which generates printing data of a layout mark to be printed on an optical surface of the spectacle lens, a printing device implemented by an inkjet printer which prints the layout mark on the spectacle lens in cooperation with the conveyance device based on the printing data, and a UV curing device which cures the ink printed on the spectacle lens, the printing data generation device including a storage unit which stores image data of the layout mark, and printing condition data including a plurality of printing conditions each corresponding to a surface state of the spectacle lens, and a process unit which generates the printing data based on the image data and a printing condition selected from the plurality of printing conditions.

According to the present invention, there is provided a method of printing layout marks on spectacle lenses, comprising the steps of holding a spectacle lens, inputting a surface state of a printing surface of the spectacle lens, selecting a printing condition suitable for the spectacle lens to be printed among a plurality of printing conditions, each of which is set in correspondence with the surface state, and printing a layout mark on the spectacle lens using an inkjet printer in accordance with the selected printing condition.

Effects of the Invention

According to the present invention, layout marks can be printed on spectacle lenses under appropriate printing conditions in accordance with, for example, the presence or absence of a coating, the type of coating, and the type of lens. This prevents the marks from being formed at a low density, adjacent liquid droplets from coming into contact with each other, and traces of the marks from remaining on the lenses even after the marks are wiped away.

In the present invention, since an inkjet printer is used as a printing device, various layout marks can be printed on spectacle lenses by changing the discharge pattern of ink.

BEST MODE FOR CARRYING OUT THE INVENTION

Figure 1:
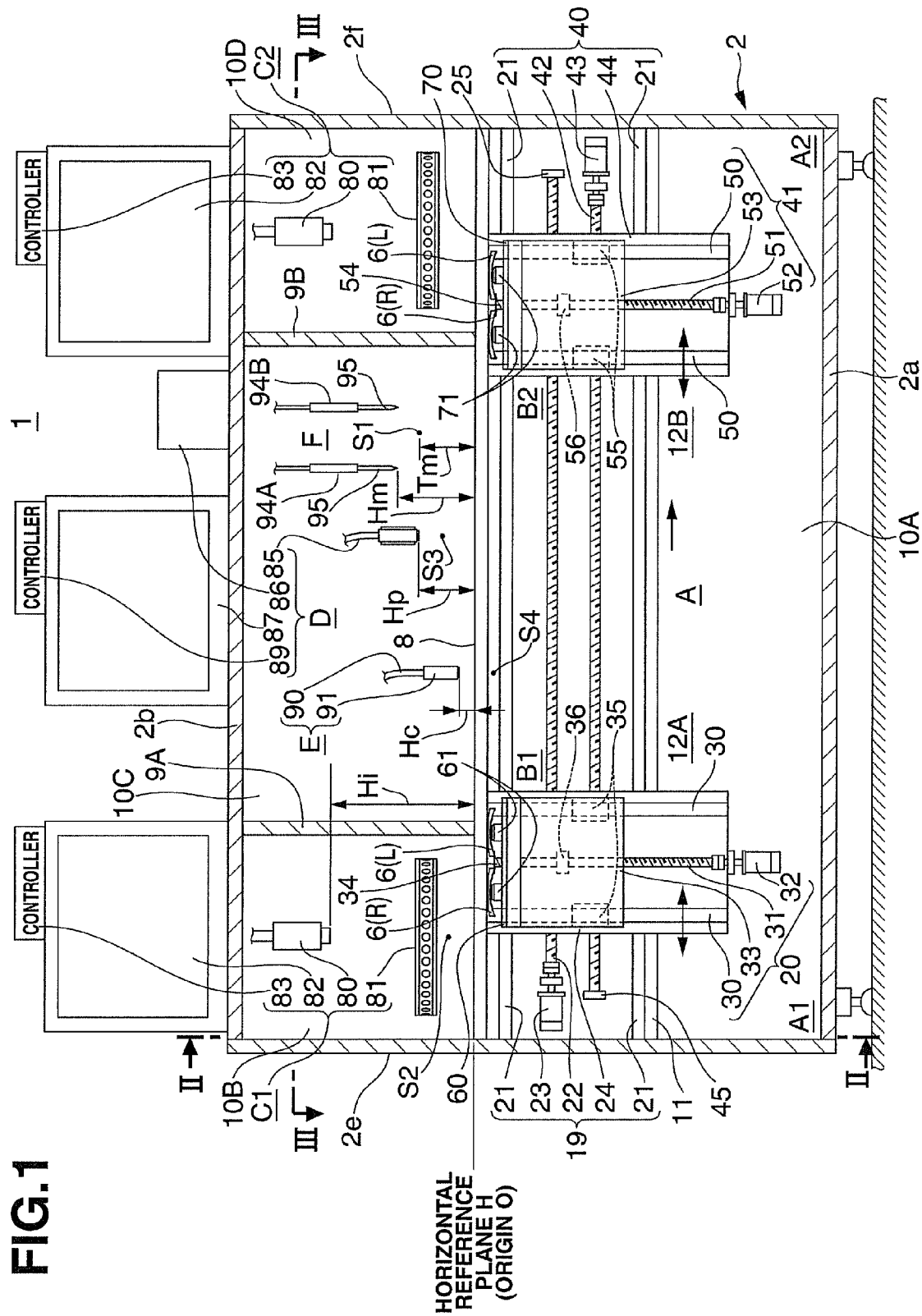
FIG. 1 is a sectional view showing the schematic arrangement of a marking apparatus for spectacle lenses according to the present invention.
Figure 2:
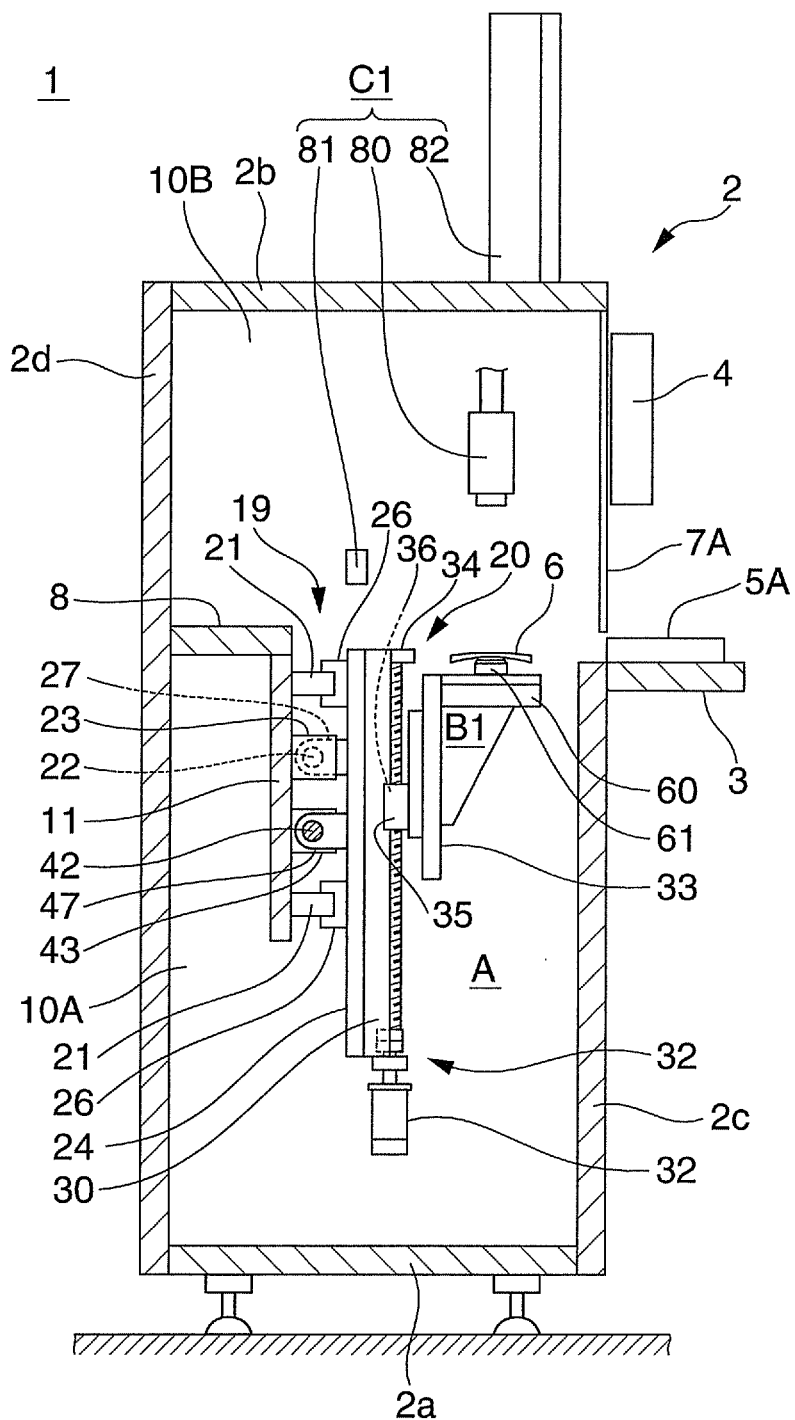
FIG. 2 is a sectional view taken along a line II-II in FIG. 1.
Figure 3:
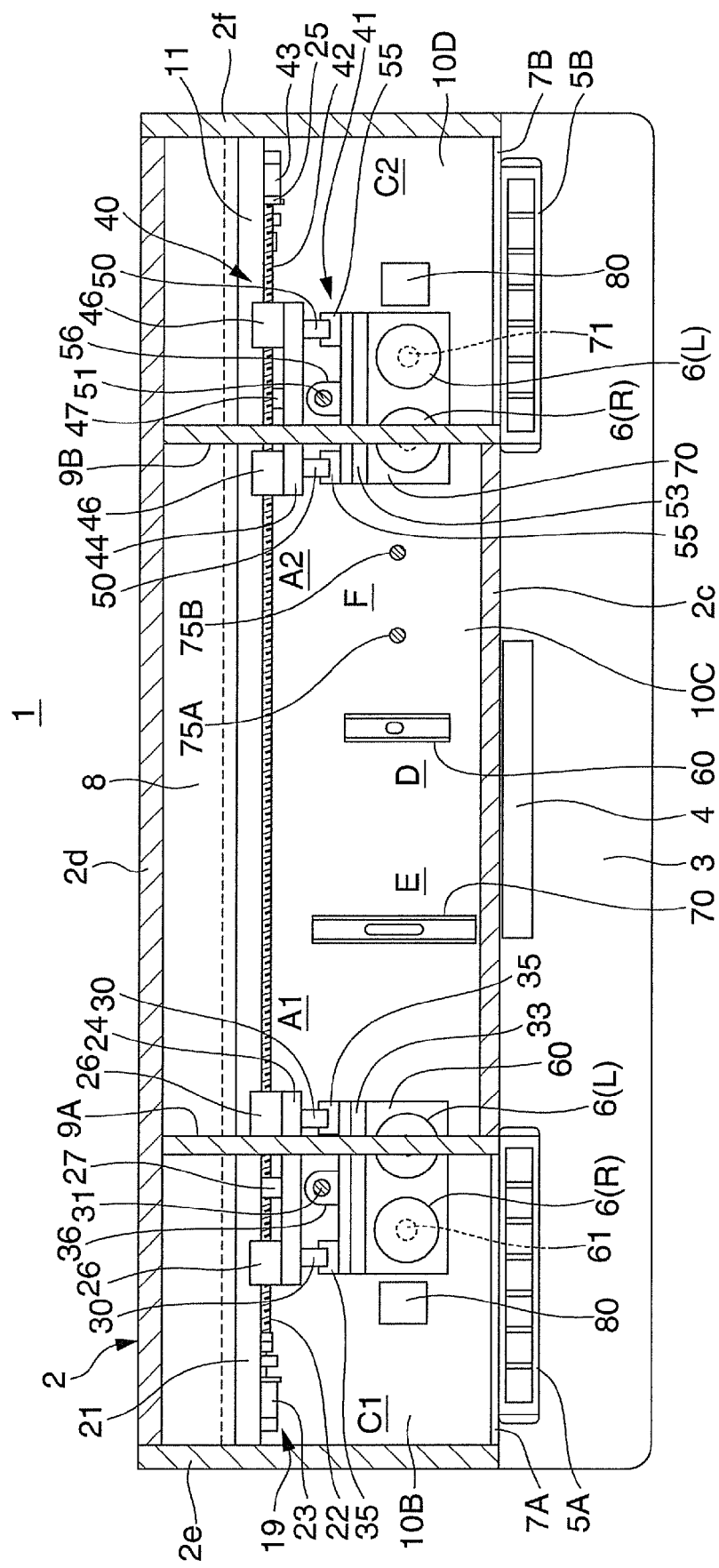
FIG. 3 is a sectional view taken along a line III-III in FIG. 1.

The present invention will be described in detail below with reference to the accompanying drawings.

Referring to FIGS. 1 to 4, a marking apparatus 1 for spectacle lenses includes, for example, a housing 2 installed on the floor surface, and a conveyance device A (including conveyance devices A1 and A2), a lens holding device B (including lens holding devices 31 and B2), an image processing device C (including image processing devices C1 and C2), a printing device D, an ultraviolet curing device (to be simply referred to as a UV curing device hereinafter) E, a height measuring device F, a control device (a programmable logic controller abbreviated as "PLC") G, a printing control computer H, and an input means J.

The housing 2 is formed in a horizontally elongated box shape and includes a bottom plate 2a, a ceiling plate 2b, a front plate 2c, a back plate 2d, and a pair of left and right side plates 2e and 2f. An operation table 3, a touch panel 4, two sets of operation buttons 5A and 5B, and two slots 7A and 7B from which lenses 6 are to be loaded into the housing 2 are provided on the front side of the housing 2. Note that for the sake of distinction between right and left lenses 6, suffices R and L are added to reference numerals denoting these lenses.

Figure 4:
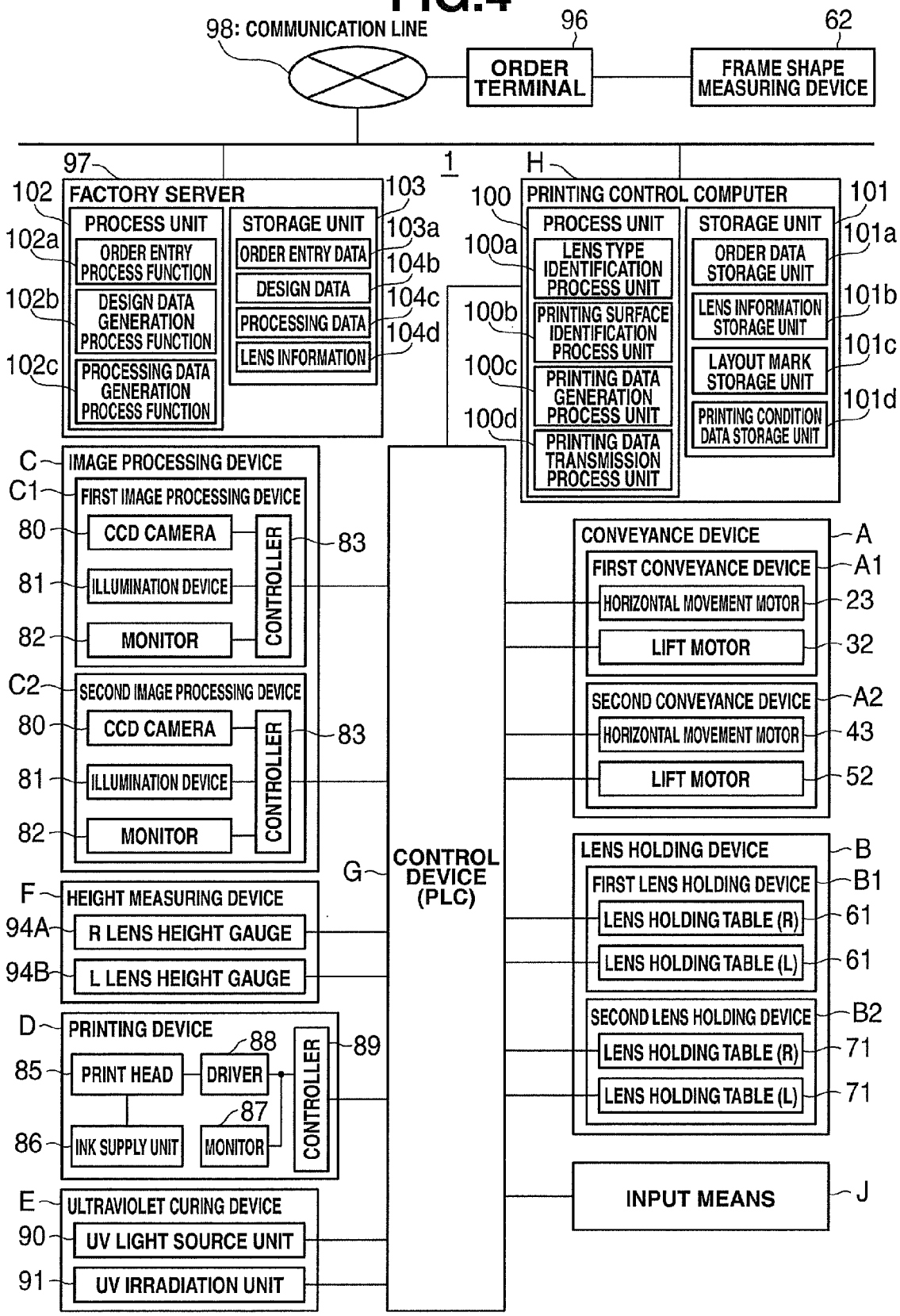
FIG. 4 is a block diagram showing the entire configuration of a spectacle lens supply system including the marking apparatus.

The touch panel 4 and operation buttons 5A and 5B constitute the input means J shown in FIG. 4, and are used to operate, for example, the conveyance device A, lens holding device B, image processing device C, printing device D, UV curing device E, and height measuring device F.

The interior of the housing 2 is divided into first to fourth chambers 10A to 10D by a base 8 and a pair of left and right partition plates 9A and 9B. The rear, left, and right ends of the base 8 are fixed to the intermediate portions of the back plate 2d and the left and right side plates 2e and 2f in the height direction, respectively. A space below the base 8 forms the first chamber 10A which extends across the entire length of the housing 2. A space above the base 8 is divided into three chambers by the pair of partition plates 9A and 9B so that they are aligned in the longitudinal direction of the housing 2, thereby forming the second to fourth chambers 10B to 10D. The first chamber 10A and the second to fourth chambers 10B to 10D are positioned so that the front end of the base 8 is spaced apart from the front plate 2c backwards, thereby making them communicate with each other. The upper ends of the partition plates 9A and 9B are fixed to the ceiling plate 2b. The lower ends of the partition plates 9A and 9B are partially fixed to the base 8. The front and rear ends of the partition plates 9A and 9B are fixed to the front plate 2c and back plate 2d, respectively.

A mounting plate 11, the conveyance device A, and the lens holding device B are disposed in the first chamber 10A. The first image processing device C1 is disposed in the second chamber 10B. The printing device D, UV curing device E, and height measuring device F are disposed in the third chamber 10C. The second image processing device C2 is disposed in the fourth chamber 10D. The first image processing device C1 and second image processing device C2 constitute the image processing device C.

The mounting plate 11 extends downwards on the lower surface of the front end of the base 8. The lens holding device B which holds the lenses 6 is disposed on the front side of the mounting plate 11 through the conveyance device A.

The conveyance device A includes the first and second conveyance devices A1 and A2 which operate independently. The lens holding device B includes the first and second lens holding device B1 and B2.

The first conveyance device A1 includes a horizontal movement mechanism 19 which horizontally conveys the first lens holding device B1, and a lift mechanism 20 which lifts or lowers the first lens holding device B1.

The horizontal movement mechanism 19 includes, for example, a pair of upper and lower horizontal movement guide rails 21, ball screw shaft 22, horizontal movement motor 23, and horizontal movement table 24. The horizontal movement guide rails 21 extends horizontally on the front surface of the mounting plate 11. The ball screw shaft 22 extends horizontally between the pair of guide rails 21. The horizontal movement motor 23 rotates the ball screw shaft 22. The horizontal movement table 24 horizontally moves along the guide rails 21 upon rotation of the ball screw shaft 22.

The left end of the ball screw shaft 22 is connected to the output shaft of the horizontal movement motor 23. The right end of the ball screw shaft 22 is rotatably, pivotally supported by a bearing 25. The horizontal movement motor 23 and bearing 25 are fixed to the mounting plate 11. Sliders 26 which slide along the guide rails 21, and a nut 27 are provided on the back surface of the horizontal movement table 24. The nut 27 threadably engages with the ball screw shaft 22, and transforms the rotational motion of the ball screw shaft 22 into a rectilinear motion to transmit it to the horizontal movement table 24.

The lift mechanism 20 includes, for example, a pair of right and left guide rails 30, ball screw shaft 31, lift motor 32, and lift table 33. The pair of right and left guide rails 30 are provided on the front surface of the horizontal movement table 24. The guide rails 30 vertically extend parallel to each other. The ball screw shaft 31 is provided between and parallel to the pair of guide rails 30. The lift motor 32 rotates the ball screw shaft 31. The lift table 33 lifts or lowers along the guide rails 30 upon rotation of the ball screw shaft 31.

The lower end of the ball screw shaft 31 is connected to the output shaft of the lift motor 32. The upper end of the ball screw shaft 31 is rotatably, pivotally supported by a bearing 34. The lift motor 32 and bearing 34 are fixed to the horizontal movement table 24. Sliders 35 which slide along the guide rails 30, and a nut 36 are provided on the back surface of the lift table 33. The nut 36 threadably engages with the ball screw shaft 31, and transforms the rotational motion of the ball screw shaft 31 into a rectilinear motion to transmit it to the lift table 33.

The horizontal movement table 24 of the first conveyance device A1 as described above reciprocally moves along the portion below the second and third chambers 10B and 10C in the first chamber 10A upon driving of the horizontal movement motor 23. The lift table 33 lifts upon driving of the lift motor 32. When the lift table 33 has lifted and stopped in the second chamber 10B, lenses 6 are attached to or detached from the first lens holding device B1, and the first image processing device C1 senses and processes images of the lenses 6. Also, when the lift table 33 passes through the interior of the third chamber 10C or below the third chamber 10C in a lifted state, the height measuring device F measures the heights of the lenses 6, the printing device D forms marks on the lenses 6, and the UV curing device E cures ink.

The second conveyance device A2 has the same arrangement as the first conveyance device A1, and includes a horizontal movement mechanism 40 which horizontally conveys the second lens holding device B2, and a lift mechanism 41 which lifts or lowers the second lens holding device B2.

The horizontal movement mechanism 40 includes, for example, the pair of guide rails 21 provided on the front surface of the mounting plate 11, a ball screw shaft 42, a horizontal movement motor 43, and a horizontal movement table 44. The ball screw shaft 42 extends horizontally between the pair of guide rails 21. The horizontal movement motor 43 rotates the ball screw shaft 42. The horizontal movement table 44 horizontally moves along the guide rails 21 upon rotation of the ball screw shaft 42.

The ball screw shaft 42 is provided below and parallel to the ball screw shaft 22. The right end of the ball screw shaft 42 is connected to the output shaft of the horizontal movement motor 43. The left end of the ball screw shaft 42 is rotatably, pivotally supported by a bearing 45. The horizontal movement motor 43 and bearing 45 are fixed to the mounting plate 11. Sliders 46 which slide along the guide rails 21, and a nut 47 are provided on the back surface of the horizontal movement table 44. The nut 47 threadably engages with the ball screw shaft 42, and transforms the rotational motion of the ball screw shaft 42 into a rectilinear motion to transmit it to the horizontal movement table 44.

The lift mechanism 41 includes, for example, a pair of right and left guide rails 50, ball screw shaft 51, lift motor 52, and lift table 53. The guide rails 50 are provided on the front surface of the horizontal movement table 44. The guide rails 50 vertically extend parallel to them. The ball screw shaft 51 extends vertically between the pair of guide rails 50 to be parallel to them. The lift motor 52 rotates the ball screw shaft 51. The lift table 53 lifts or lowers along the guide rails 50 upon rotation of the ball screw shaft 51.

The lower end of the ball screw shaft 51 is connected to the output shaft of the lift motor 52. The upper end of the ball screw shaft 51 is rotatably, pivotally supported by a bearing 54. The lift motor 52 and bearing 54 are fixed to the horizontal movement table 44. Sliders 55 which slide along the guide rails 50, and a nut 56 are provided on the back surface of the lift table 53. The nut 56 threadably engages with the ball screw shaft 51, and transforms the rotational motion of the ball screw shaft 51 into a rectilinear motion to transmit it to the lift table 53. Note that the guide rails 21 are used commonly to the horizontal movement table 24 of the first conveyance device A1 and the horizontal movement table 44 of the second conveyance device A2.

The horizontal movement table 44 of the second conveyance device A2 as described above reciprocally moves the portion below the third and fourth chambers 10C and 10D in the first chamber 10A upon driving of the horizontal movement motor 43. The lift table 53 lifts upon driving of the lift motor 52. When the lift table 53 has lifted and stopped in the fourth chamber 10D, lenses 6 are attached to or detached from the second lens holding device B2, and the second image processing device C2 senses and processes images of the lenses 6. Also, when the lift table 53 passes through the interior of the third chamber 10C or below the third chamber 10C in a lifted state, the height measuring device F measures the heights of the lenses 6, the printing device D forms marks on the lenses 6, and the UV curing device E cures ink.

The first and second conveyance devices A1 and A2, first and second lens holding devices B1 and B2, and first and second image processing devices C1 and C2 serve to speed up a marking process. That is, the marking apparatus 1 according to this embodiment can perform a first operation using one lens conveyance device, one lens holding device, and one image processing device while performing a second operation using the other conveyance device, the other lens holding device, and the other image processing device.

The first operation includes loading and unloading, image sensing, and image processing of lenses 6. The second operation includes marking, height measurement, ink curing, image sensing, and image processing of the lenses 6.

The first lens holding device B1 includes a horizontal lens table 60 provided in the upper portion of the front surface of the lift table 33 of the first conveyance device A1, and a pair of right and left lens holding tables 61 provided on the lens table 60. In the lens table 60, all portions to be captured by a camera are matte black finished for image processing.

The pair of right and left lens holding tables 61 are provided with a right-eye lens 6(R) on the left side and a left-eye lens 6(L) on the right side in FIG. 1, and are connected to a vacuum generator (not shown). Vacuum pads (not shown) are disposed on the upper surfaces of the lens holding tables 61. The vacuum generator includes a vacuum source (vacuum tank or ejector), and a remote control valve which switches between a vacuum state and a vacuum broken state. The remote control valve undergoes switching control by a driving signal from the control device G.

Lenses 6 are supplied onto the lens holding tables 61 while the horizontal movement table 24 of the first conveyance device A1 is kept stopped immediately beneath the second chamber 10B. That is, first, the operator holds and loads lenses 6 from the slot 7A into the housing 2, and places them on the lens holding tables 61. At this time, the lenses 6 are placed so that their optical surfaces face up, and the geometric centers of the lenses 6 are matched with the centers of the lens holding tables 61. These optical surfaces are printing surfaces to undergo marking.

Then, the vacuum generator evacuates the lens holding tables 61 to a vacuum to make them chuck and hold the lenses 6. A process of supplying lenses 6 onto the lens holding tables 61 ends as the lenses 6 are chucked and held by the lens holding tables 61.

The second lens holding device B2 has exactly the same arrangement as the first lens holding device B1. That is, the second lens holding device B2 includes a horizontal lens table 70 provided in the upper portion of the front surface of the lift table 53 of the second conveyance device A2, and a pair of right and left lens holding tables 71 provided on the lens table 70. In the lens table 70, all portions to be captured by a camera are matte black finished for image processing.

Of the pair of lens holding tables 71, the lens holding table 71 positioned on the left side in FIG. 1 is provided with a right-eye lens 6(R) to be fitted into a spectacle frame. The lens holding table 71 positioned on the right side is provided with a left-eye lens 6(L). The lens holding tables 71 are connected to a vacuum generator (not shown). Vacuum pads (not shown) are disposed on the upper surfaces of the lens holding tables 71. The vacuum generator includes a vacuum source (vacuum tank or ejector), and a remote control valve which switches between a vacuum state and a vacuum broken state. Note that a vacuum source may be independently or commonly provided to the first and second lens holding devices B1 and B2.

Lenses 6 are supplied onto the lens holding tables 71 while the horizontal movement table 44 of the second conveyance device A2 is kept stopped immediately beneath the fourth chamber 10D. That is, first, the operator holds and loads lenses 6 from the slot 7B into the housing 2, and places them on the lens holding tables 71. At this time, the lenses 6 are placed so that their optical surfaces face up, and the geometric centers of the lenses 6 are matched with the centers of the lens holding tables 71. These optical surfaces are printing surfaces to undergo marking. Then, the vacuum generator evacuates the lens holding tables 71 to a vacuum to make them chuck and hold the lenses 6. A process of supplying lenses 6 onto the lens holding tables 71 ends as the lenses 6 are chucked and held by the lens holding tables 71.

The first image processing device C1 senses and processes images of the lenses 6(R) and 6(L) held by the first lens holding device B1. The first image processing device C1 includes an image sensing means (CCD camera) 80, illumination device (LED) 81, image sensing device monitor 82, and controller 83. The image sensing means 80 senses images of the lenses 6. The illumination device 81 illuminates the lenses 6. The image sensing device monitor 82 is provided on the housing 2. The controller 83 controls the operations of the image sensing means 80, illumination device 81, and monitor 82, and performs image processing.

The controller 83 has the following four functions.

(1) The first function is a sensed image display function of displaying on the monitor 82 a lens video image captured by the CCD camera 80.

(2) The second function is a printing reference detection function of detecting a printing reference (a hidden mark or a dot formed on it for a progressive-power lens, or a segment corner portion or a dot formed on it for a bifocal lens) on the lens 6 by image processing from the captured lens image. Note that the hidden mark or segment corner portion preferably has a dot formed on it using easy-to-wipe ink in advance. This is done to facilitate position identification.

(3) The third function is a holding position check function of checking whether alignment is precisely performed.

(4) The fourth function is a printing check function of checking the printing result.

The holding position check function is used to confirm whether the positions and orientations of the lenses 6(L) and 6(R) are correct with respect to the right and left lens holding tables 61, and whether the lenses 6(L) and 6(R) after printing have shifted from their holding positions. The holding position check function includes, for example, the following five functions.

(1) The first function is a positioning mark display function of displaying marks (positioning marks), which indicate the target positions for aligning printing reference points on the lenses and their tolerances (to be referred to as printing reference point determination regions hereinafter), on the screen upon superposition on the lens video image.

(2) The second function is a lens position determination function of determining whether the printing reference points on the lenses fall within the printing reference point determination regions.

(3) The third function is a lens position final determination function of determining whether all determination results are normal.

(4) The fourth function is an interlock control function of inhibiting a shift to the next process unless the determination results obtained by the lens position final determination function are OK.

(5) The fifth function is a lens position check result display function of displaying these determination results on the monitor.

The printing check function is used to confirm, for example, whether layout marks are printed on the lenses 6 at correct positions in correct orientations, whether the layout marks have errors, whether the layout marks are printed on the lenses 6 in accordance with details set in advance, and whether the layout marks are printed sharply. More specifically, the printing check function includes, for example, the following seven functions.

(1) The first function is a lens position shift determination function of determining whether the positions of the lenses have shifted after printing, based on whether the printing reference points fall within the printing reference point determination regions.

(2) The second function is a mark position determination region display function of displaying tolerances (to be referred to as mark position determination regions hereinafter), according to which the positions of the layout marks are determined, on the screen upon superposition on the lens video image.

(3) The third function is a mark position determination function of determining whether the printed layout marks fall within the mark position determination regions.

(4) The fourth function is a mark detail determination function of collating the printed layout marks with design layout marks by pattern matching to determine whether the printed layout marks are correct.

(5) The fifth function is a mark printing final determination function of determining whether all determination results are normal.

(6) The sixth function is a function of inhibiting lens detachment unless the determination results obtained by the mark printing final determination function are OK. Note that the lenses can be detached as the operator disables this function upon confirmation.

(7) The seventh function is a printing check result display function of displaying these determination results on the monitor. Note that mark position determination may be done partially. For example, only lines in the vicinities of the printing reference points, such as the ends of horizontal lines on the sides of these printing reference points, may be evaluated.

The mark detail determination process of determining whether the printed layout marks are correct may also be performed partially. For example, only right or left indication and lens type identification indication may be evaluated. Note that the height position (image sensing position S2) of the upper surface of the lens table 60 relative to the CCD camera 80 is set so as to display a captured image at a predetermined size. Alignment marks and determination regions are set in accordance with the predetermined size of the captured image. The image sensing position S2 can be set by adjusting the height position of the lens table 60 so that the printing reference points in the image sensing position video have a predetermined distance between them. Note that the magnification of the video image, marks, or determination regions may be adjusted instead of adjusting the height position of the lens table 60. Also, the CCD camera 80 may be provided individually for each of the right and left lenses.

The second image processing device C2 is different from the first image processing device C1 in that the former is disposed in the fourth chamber 10D and senses and processes images of the lenses 6 held by the second lens holding device B2. However, the second image processing device C2 has exactly the same arrangement as the first image processing device C1. Therefore, the same reference numerals denote the same constituent parts, and a description thereof will not be given.

The printing device D is disposed at the center of the third chamber 10C. The printing device D is implemented by an inkjet printer and includes, for example, a printhead 85, an ink supply unit 86, a printing device monitor 87, a driver 88 (FIG. 4), a controller 89, and an interface with the control device G and printing control computer H. A line head having a width large enough to cover the diameter of the lens 6 is used as the printhead 85. A printhead having a function of finely adjusting the height in accordance with marking conditions may be used. The ink supply unit 86 supplies UV curing ink to the printhead, and includes an ink bottle, supply tube, ink replenishing means, and pressurized ink forcible supply means. The ink in the ink bottle is always agitated using a magnet stirrer to suppress sedimentation of the ink.

The UV curing device E cures the ink applied onto the lens 6 by the printing device D. The UV curing device E includes a UV light source unit (not shown) and UV irradiation unit, and is disposed on one side of the printing device D. The UV light source unit includes a UV light source and a starter. ON/OFF of the UV light source is controlled by the control device G. The UV irradiation unit includes a light guide portion 90 and UV irradiation portion 91. The light guide portion 90 is formed by an optical fiber bundle which guides light from the UV light source to the UV irradiation portion 91. The UV irradiation portion 91 irradiates the printing surface of the lens 6 with the light guided by the light guide portion 90. The UV irradiation portion 91 is formed by linearly arraying optical fiber bundles of the light guide portion 90 in the front-to-back direction of the third chamber 10C so that the ends of these optical fiber bundles are aligned face down. The UV irradiation portion 91 emits UV light toward the lens 6 in a band shape having a width larger than the diameter of the lens 6. Providing the light guide portion 90 to the UV irradiation portion 91 makes it possible to prevent the UV irradiation portion 91 from being influenced by heat generated by the light source in the UV light source unit and an air current produced by a cooling fan.

The height measuring device F measures the heights of the centers of the upper surfaces of the lenses 6. The height measuring device F includes a pair of right and left height gauges 94A and 94B and is disposed on the side of the printing device D opposite to the UV curing device E. Extendable probes 95 are provided at the lower ends of the height gauges 94A and 94B. The height gauges 94A and 943 measure the heights of the lenses 6 based on the amounts of upward movement of the probes 95 as they are lifted by the lenses 6. The measured data are sent to the control device G. The interval between the height gauges 94A and 94B is equal to that between the right and left lens holding tables 61 or 71. Note that to measure the curves of the lenses 6, a pair of height gauges which measure the heights of the lenses 6 on their edge sides may be provided on the two sides of the height gauges 94A and 94B. Although a contact measuring device is used in this embodiment, a non-contact measuring device (for example, a laser displacement gauge) can also be used.

FIG. 4 is a block diagram showing a spectacle lens supply system including the marking apparatus. The spectacle lens supply system manufactures spectacle lenses in accordance with an order of spectacle lenses placed online by an ordering source.

Referring to FIG. 4, an order terminal 96 is installed in the ordering source and connected to a lens manufacturing factory as a lens manufacturer via a communication line 98. Examples of the ordering source include a spectacle shop, ophthalmologic clinic, private individual, and lens manufacturer's business office. A public communication channel, a dedicated channel, or the Internet, for example, can be used as the communication line 98, and a relay station may be provided midway. Although only one order terminal is shown in FIG. 4, a large number of order terminals can be connected to the manufacturer via the communication line 98.

The order terminal 96 is a computer which includes a communication means for connecting the spectacle lens supply system to the factory via the communication line 98, and serves as an online order terminal capable of transmitting and receiving information necessary to order lenses. The order terminal 96 is connected to a frame shape measuring device 62 which measures the shape of a spectacle frame (the inner peripheral shape of a rim frame or the outer peripheral shape of a lens). The order terminal 96 can receive data from the frame shape measuring device 62.

A factory server 97 and the lens marking apparatus 1 are installed in the factory as a manufacturer. The factory server 97 is a computer which performs a process of receiving an order from the order terminal 96, and a process of generating data necessary to manufacture lenses based on the details of the received order, and stores the data.

The factory server 97 includes a process unit 102 and storage unit 103. The process unit 102 has an order entry process function 102a, design data generation process function 102b, and processing data generation process function 102c. With the order entry process function 102a, an order from the order terminal 96 is received and stored as order entry data 103a. With the design data generation process function 102b, the shapes of spectacle lenses are calculated based on the order entry data 103a and stored as design data 104b. With the processing data generation process function 102c, device control data and processing conditions in various manufacturing processes are generated based on the order entry data 103a and design data 104b, and stored as processing data 104c.

The storage unit 103 not only stores the order entry data 103a, design data 104b, and processing data 104c, but also stores, for example, lens information 104d and frame information necessary for processes by the process unit 102. The lens information 104d includes layout mark information and layout mark image data.

Note that examples of the order entry data include spectacle lens information, spectacle frame information, prescription values, and layout information. Examples of the spectacle lens information include the lens material, the refractive index, the type of optical design of lens front and back surfaces, the lens outer diameter, the lens center thickness, the edge thickness, decentering, the base curve, the corridor length, the inset amount, the type of beveling, the dye color, and the type of coating. Examples of the spectacle frame information include the product identification name, the frame size, the material, the frame curve, the edge shape, and the frame shape and lens shape measured by a frame tracer. Examples of the prescription values include the spherical power, the cylindrical or astigmatic power, the cylinder axis, the prescribed prism, and the addition power. Examples of the layout information include the pupillary distance, the near pupillary distance, and the eyepoint positions.

The control device G controls the overall marking apparatus 1 and is connected to the conveyance device A, lens holding device B, image processing device C, printing device D, UV curing device E, height measuring device F, printing control computer H, and input means J mentioned above.

The printing control computer H includes a process unit 100 and storage unit 101, and is connected to the control device G and to the factory server 97 via a network. The printing control computer H performs processes such as data transmission and reception to and from the factory server 97, generation of printing data, transmission of the generated printing data to the control device G, control of the control device G, and data transmission and reception to and from other devices.

The process unit 100 includes a lens type identification process unit 100a, printing surface identification process unit 100b, printing data generation process unit 100c, and printing data transmission process unit 100d. The lens type identification process unit 100a has a function of identifying the type of lens. The printing surface identification process unit 100b has a function of identifying the surface state of the printing surface of the lens 6. The printing data generation process unit 100c has a function of determining the printing conditions based on the identification result obtained by the printing surface identification process unit 100b to generate printing data based on layout marks and the set printing conditions. The printing data transmission process unit 100d has a function of transmitting the printing data.

The storage unit 101 includes an order data storage unit 101a, lens information storage unit 101b, layout mark storage unit 101c, and printing condition data storage unit 101d. The order data storage unit 101a has a function of storing order entry data sent from the order terminal 96. The lens information storage unit 101b has a function of storing lens information. The layout mark storage unit 101c has a function of storing layout marks. The printing condition data storage unit 101d has a function of storing printing condition data.

Referring to FIG. 1, the heights of the CCD camera 80, UV irradiation portion 91, and printhead 85 from the upper surface (horizontal reference plane H) of the base 8 are set to Hi, Hc, and Hp, respectively. Also, the heights of the lower ends of the probes 95 are set to Hm by the height gauges 94A and 94B while measurement is not performed. The printhead 85 is arranged at a position lower than the probes 95, and the UV irradiation portion 91 is arranged at a position lower than the probes 95 (Hm>Hp>Hc). Upon the arrangement of the UV irradiation portion 91 at a low position in this way, light emitted by the UV irradiation portion 91 does not impinge on the printhead 85, thereby preventing ink adhered to it from solidifying.

A printing operation by the first conveyance device A1 of the marking apparatus 1 having the above-mentioned structure will be described next with reference to FIGS. 6 to 8.

Figure 6:
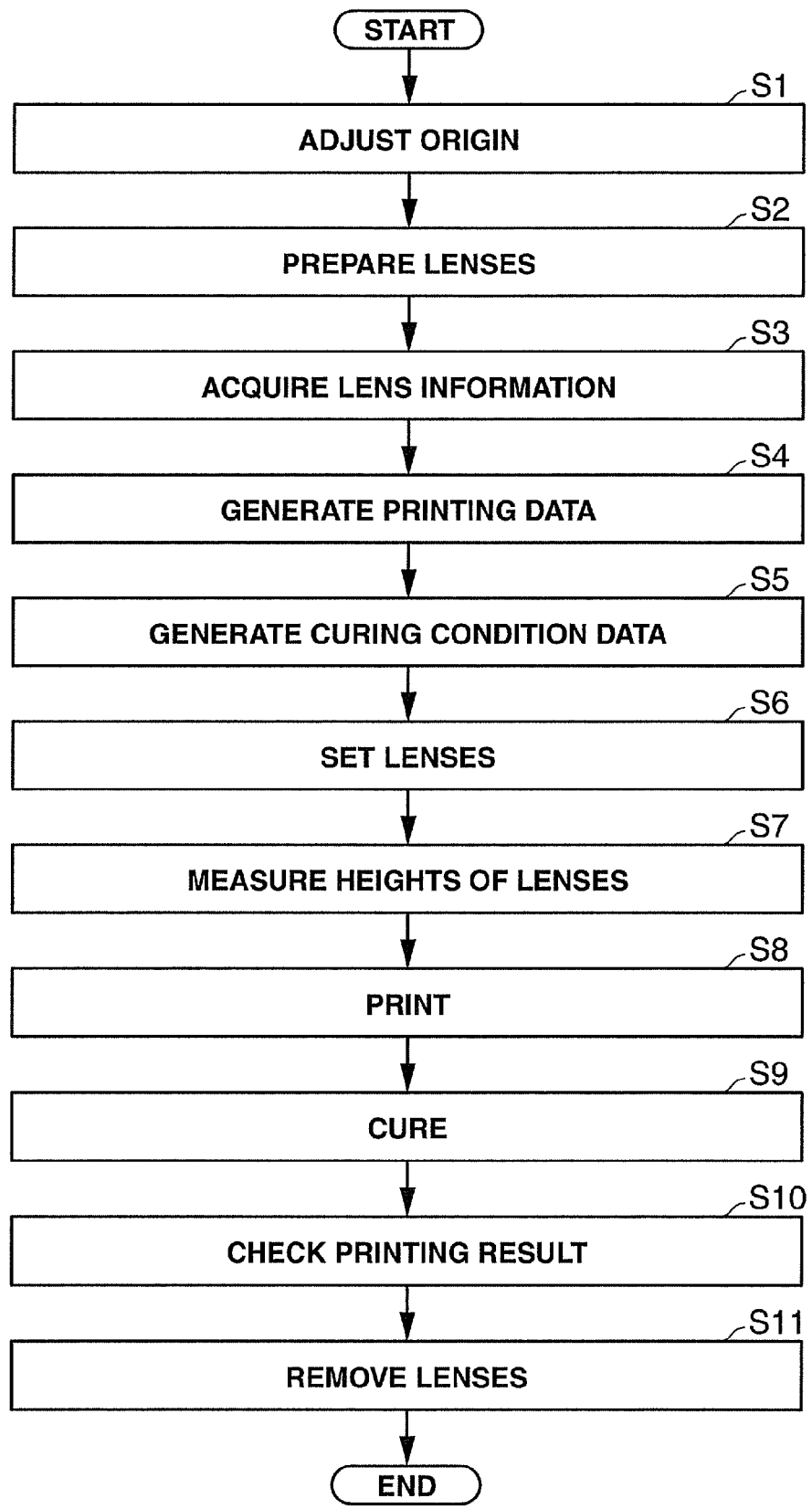
FIG. 6 is a flowchart for explaining a layout mark process.

FIG. 6 is a flowchart of a lens printing process.

1. Origin Adjustment

Origin adjustment of the lift motor 32 and zero adjustment of the values measured by the height gauges 94A and 94B are performed (step S1).

Figure 5:
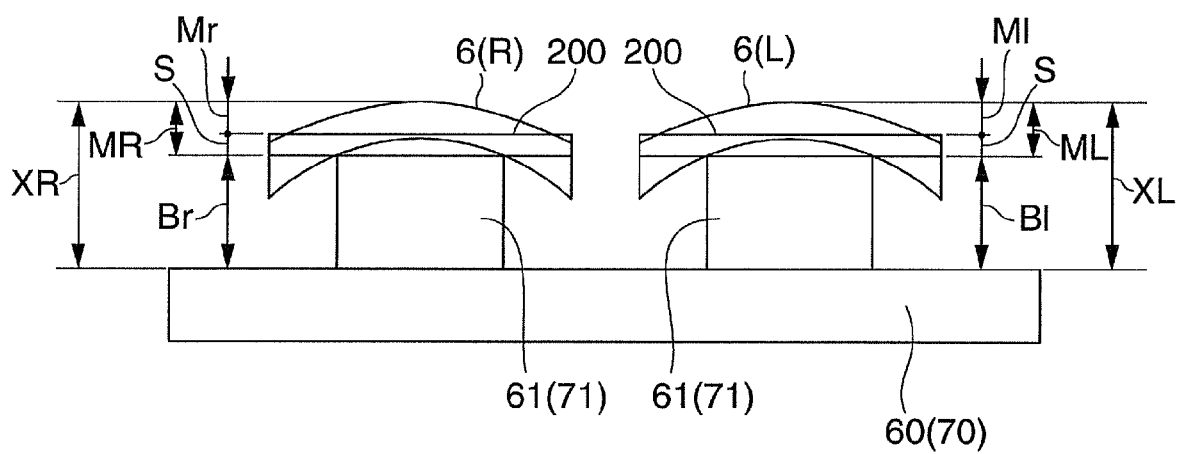
FIG. 5 is a view for explaining the heights of lenses.

In zero adjustment at the time of lens height measurement by the height gauges 94A and 94B, first, reference flat plates 200 having a known thickness value (for example, 2 mm) are chucked and held by the lens holding tables 61 or 71, as shown in FIG. 5. The lens table 60 or 70 is lifted to a height measurement position S1 (FIG. 1). The height measurement position S1 is defined under the height measuring device F at a predetermined height measurement time height Tm from the horizontal reference plane H, which allows the upper surfaces of the reference flat plates 200 to fall within the measurement ranges of the height gauges 94A and 94B. The values measured by the height gauges 94A and 94B at this time are adjusted to zero. This zero adjustment is performed individually for each of the height gauges 94A and 94B.

In origin adjustment of the lift motor 32, the height of the lens table 60 when the upper surface of the lens table 60 coincides with the upper surface (horizontal reference plane) of the base 8 is defined as the height origin of the lens table 60. The rotation position (the rotation speed and rotation angle) of the lift motor 32 when the lens table 60 is at the height origin is defined as the rotation position origin of the lift motor 32. Origin adjustment need not be performed every time and may be performed at an appropriate interval. Note that referring to FIG. 5, let Br be the height from the upper surface of the lens table 60 or 70 to the upper end of the right-eye lens holding table 61 or 71, respectively, and Bl be the height from the upper surface of the lens table 60 or 70 to the upper end of the left-eye lens holding table 61 or 71, respectively. Also, XR be the height from the upper surface of the lens table 60 or 70 to the center of the upper surface of the lens 6(R), and XL be the height from the upper surface of the lens table 60 or 70 to the center of the upper surface of the lens 6(L). Moreover, let Mr be the height from the reference flat plate 200 to the lens 6(R), and Ml be the height from the reference flat plate 200 to the lens 6(L). Let MR be the height from the upper end of the right-eye lens holding table 61 or 71 to the center of the upper surface of the lens 6(R). Let ML be the height from the upper end of the left-eye lens holding table 61 or 71 to the center of the upper surface of the lens 6(L). Then, the heights XR and XL (see FIGS. 5 and SA) from the upper surface of the lens table 60 to the centers of the upper surfaces of the lenses 6(R) and 6(L), respectively, are given by:

$$XR=Br+S+Mr=Br+MR$$

$$XL=Bl+S+Ml=Bl+ML$$

where Br and Bl (FIG. 5) are the heights of the right and left lens holding tables 61, respectively.

2. Lens Preparation

Lenses are prepared in accordance with the following procedure (step S2).

(1) A pair of right and left lenses to be printed (uncut lenses or semifinished lenses) are prepared in accordance with manufacturing instruction sheets. Note that one of right and left lenses, or two right or left lenses may be prepared.

(2) A dot is formed on a hidden mark for a progressive-power lens.

(3) Lenses 6 are placed on a tray, and manufacturing instruction sheets are added to the tray.

(4) The tray is sent to a printing process.

3. Lens Information Acquisition

Lens information is acquired in accordance with the following procedure (step S3).

(1) An identification code (for example, a barcode or an RFID tag) printed on the instruction sheets is read by an identification code reader (for example, a barcode reader or an RFID reader), and is sent from the control device G to the printing control computer H.

(2) The printing control computer H transmits the identification code to the factory server 97 to acquire processing object information (for example, lens information, layout mark information, and layout mark image data) necessary to print layout marks from the factory server 97, and stores it in the lens information storage unit 101b.

(3) The printing control computer H transmits, to the controller 83 of the first image processing device C1, data of the acquired processing target information, which is necessary for a lens holding process and printing check process by the first image processing device C1.

4. Printing Data Generation

Printing data is generated (step S4).

Figure 7:
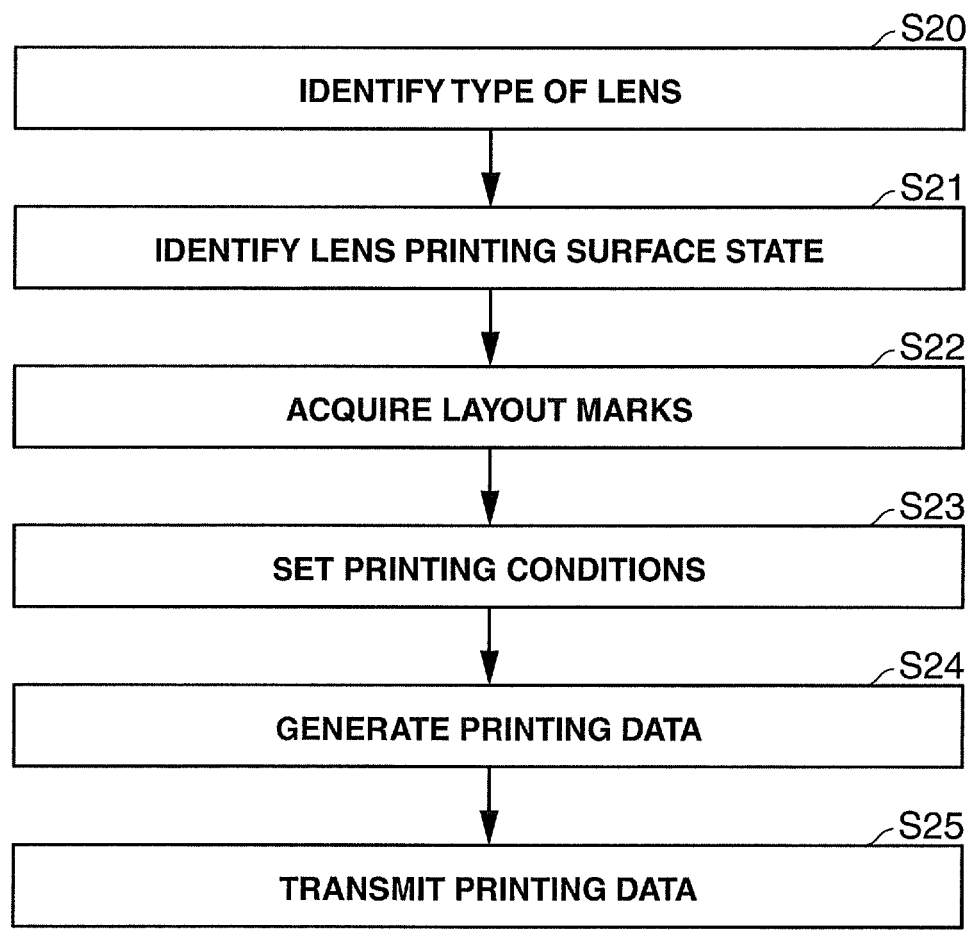
FIG. 7 is a flowchart for explaining a printing data generation process.

Printing data is generated in accordance with the procedure in steps S20 to S25 shown in FIG. 7.

(1) The printing control computer H identifies the type of lens based on the acquired lens information (step S20).

(2) The printing control computer H determines the state of the printing surface (for example, the wettability for ink, the fixability of ink, and the curve) in accordance with a printing surface state determination process program, based on the acquired lens information (step S21). Note that the wettability for ink and fixability of ink may be specified based on the presence or absence of a coating on the printing surface, and the type of coating.

(3) Layout marks to be printed are acquired (step S22).

(4) A printing condition setting program determines the printing conditions in accordance with the determined state of the printing surface of the lens. More specifically, a printing condition table, as shown in Table 1, is generated in advance to determine the printing conditions (the line width, the amount of liquid per dot, the interval between adjacent dots, the conveyance speed, and the interval between the printing surface and the printhead) based on the generated table (step S23).

TABLE 1

| Lens to be Printed | | | | Printing Conditions | | |
|---|---|---|---|---|---|---|
| | | | | | Resolution | |
| Printing Surface Outermost Layer | Wettability for Ink | Fixability of Ink | Line Width | Amount of Liquid Per Dot | Head Widthwise Direction Discharge Nozzles | Conveyance Direction Conveyance Speed |
| Blank | A (Small Contact Angle) | A (High Fixability) | Very Small | Two Drops | Every Other Nozzle | High |
| Hard Coating | B | A | Small | Three Drops | Every Other Nozzle | High |

TABLE 1-continued

| Lens to be Printed | | | | Printing Conditions | | | |
|---|---|---|---|---|---|---|---|
| | | | | | | Resolution | |
| Printing Surface Outermost Layer | Wettability for Ink | Fixability of Ink | Line Width | Amount of Liquid Per Dot | Head Widthwise Direction Discharge Nozzles | Conveyance Direction Conveyance Speed | |
| AR Coating | C | B | Normal | Six Drops | All Nozzles | Normal | |
| Antifouling Coating 1 | C | B (Low Fixability) | Normal | Seven Drops | All Nozzles | Normal | |
| Antifouling Coating 2 | D (Large Contact Angle) | B | Normal | Eight Drops | All Nozzles | Normal | |

The printing condition table shown in Table 1 represents the printing conditions corresponding to the surface state of the convex surface of the lens. The surface state varies depending on the presence or absence of a coating, and the type of coating. Table 1 describes a surface state having no coating as a blank. Table 1 also describes a hard coating, an AR coating, and two types of antifouling coatings as the type of coating.

The blank (semi-lens) is a lens to be polished in the factory. Marks to be printed on the blank are necessary to confirm a block reference, a layout reference for optical measurement points, and the type of lens in polishing. These marks are wiped away using an organic solvent after the end of the polishing process. Hence, the following three requirements are to be satisfied in printing marks on the blank.

The first requirement is easy viewing of layout reference points.

The second requirement is easy removal.

The third requirement is formation of no traces (ghosts) that may remain on the blank after the marks are removed.

The following two printing conditions in printing marks on the blank are set to satisfy the above-mentioned requirements.

The first printing condition is a decrease in width of lines which constitute the marks to improve the removal performance and ghost prevention performance.

The second printing condition is a decrease in amount of ink to be dropped on the lens to improve the removal performance and ghost prevention performance.

Especially for a blank stored for a long period of time, the ghost countermeasure greatly influences the lens quality. Also, UV curing ink can be wiped away using a nontoxic organic solvent (ethanol), and therefore can be used to easily satisfactorily maintain the operation environment. That is, the use of acetone (toxic organic solvent) in removing the marks requires acetone discharge equipments. The use of acetone also requires the operator to wear a mask and take care not to directly touch it with his or hand. In addition, in this case, the operator must undergo a special health examination.

Seven types of plastic lens materials used to form blanks are available: 1. polycarbonate, 2. a homopolymer of diethylene glycol bisallyl carbonate, 3. a copolymer of diethylene glycol bisallyl carbonate and one or more other monomers as monomeric components, 4. a polyurethane compound, 5. a polythiourethane compound, 6. a polyurethane-urea compound, and 7. an epithio compound.

The hard coating means a hard coating formed on a plastic lens blank. Roughly two types of hard coatings are available:

(1) a hard coating made of a composition containing, as its major component, metal oxide colloidal particles prepared using one or two or more of, for example, tungsten oxide ($WO_3$), zinc oxide (ZnO), silicon oxide ($SiO_2$), aluminum oxide ($Al_2O_3$), titanium oxide ($TiO_2$), zirconium oxide ($ZrO_2$), tin oxide ($SnO_2$), beryllium oxide (BeO), and antimony oxide ($Sb_2O_5$), (2) a hard coating made of a composition containing, as its major component, an organic silicon compound represented by the following general formula (1).

[Formula 1]

$$(R^{11})_a(R^{12})_b Si(OR^{13})_{4-(a+b)} \qquad (I)$$

In the above-mentioned formula (1), $R^{11}$ and $R^{12}$ represent independent organic groups selected from an alkyl group having carbon numbers of 1 to 8, an alkenyl group having carbon numbers of 2 to 8, an aryl group having carbon numbers of 6 to 8, an acyl group having carbon numbers of 1 to 8, a halogen group, a glycidoxy group, an epoxy group, an amino group, a phenyl group, a mercapto group, a methacryloxy group, and a cyano group. $R^{13}$ represents an organic group selected from an alkyl group having carbon numbers of 1 to 8, an acyl group having carbon numbers of 1 to 8, and a phenyl group having carbon numbers of 6 to 8, and a and b are independent integers of 0 or 1.

A lens to be shipped after a hard coating process alone has a high wettability on its surface (a small contact angle with ink). Hence, ink adheres onto the lens not in a dot pattern but spreads upon marking. In printing marks on a lens coated with a hard coating as mentioned above, the amount of liquid drops of ink is set slightly larger than in the blank and smaller than in antifouling coatings (to be described later). Also, unlike the above-mentioned blank, a lens coated with a hard coating is shipped directly after marking, and therefore has a line width larger than that of the blank for the sake of easy viewing.

The AR coating means an antireflection coating (deposited coating) formed on a plastic lens. The antireflection coating is a single- or multi-layer coating (note that its outermost layer has an $SiO_2$ film) containing, for example, $ZrO_2$, $SiO_2$, $TiO_2$, $Ta_2O_5$, $Y_2O_3$, $MgF_2$, or $Al_2O_3$, or a photochromic coating (note that its outermost layer has an $SiO_2$ film) containing, for example, $CrO_2$ in order to reduce reflection by the surface of an optical substrate such as a lens.

Two types of antireflection coatings A and B, for example, are available:

(Antireflection Coating A)

a multi-layer antireflection coating formed by an oxide coating layer containing zirconium oxide (high refractive index layer) and silicon dioxide (low refractive index layer), (Antireflection Coating B)

a multi-layer antireflection coating formed by a low refractive index layer containing an $SiO_2$ layer, and a complex high refractive index layer containing zirconium oxide, tantalum oxide, and yttrium oxide.

The antifouling coating means a water-repellent coating. Two types of antifouling coatings are available:

(1) an antifouling coating obtained by forming a water-repellent cured film made of a fluorine water-repellent substance in the outermost layer of an antireflection coating, (2) a water-repellent antifouling coating obtained by forming a hybrid layer containing a water-repellent organic substance or modified silicone oil having a water-repellent property in the outermost layer of the antireflection coating.

The antifouling coatings have wettabilities lower than those of, for example, the blank and hard coating (large contact angles with ink), so ink adheres onto the lens in a dot pattern. Antifouling coatings having higher wettabilities more conspicuously show this tendency. In printing marks on these types of antifouling coatings, the amount of liquid droplets of ink must be increased to obtain a visibility as good as that obtained when marks are printed on the blank or hard coating. Note that too much increase in amount of liquid droplets of ink connects adjacent dots to each other, thus degrading the appearance performance. Also, lines which constitute the marks must be formed to have a large width to improve the visibility.

In Table 1, the wettability for ink means the water repellency of the lens surface. Ink wets and spreads on the lens surface at a small contact angle, while ink adheres onto the lens surface in a dot pattern at a large contact angle.

Again in Table 1, the fixability of ink means the adhesion strength of ink to the lens surface. As the adhesion strength of ink increases, it becomes more difficult to wipe away the ink. Also, as the adhesion strength of ink increases, traces of the marks are more likely to remain on the lens after the marks are removed. A lens to which ink adheres at a high adhesion strength is prone to chemical damage on its surface.

Again in Table 1, the line width means the width of lines which represent the marks. The marks on the blank are used until they are removed at the end of a polishing process performed in the factory. Hence, marks to be printed on a blank are formed to have a small line width so as to improve the removal performance. When the lens is coated with a hard coating, an AR coating, or an antifouling coating as its surface state, marks are formed to have a large line width so as to ensure a given mark quality and visibility in preparation for shipment. To change the line width, image data of a plurality of types of layout marks having different line widths are formed, and the required one of these image data is selected.

Again in Table 1, the amount of liquid per dot means the number of ink particles which constitute one dot of the marks. The amount of ink at the same adhesion point increases as the amount of liquid droplets increases, while the amount of ink at the same adhesion point decreases as the amount of liquid droplets decreases. The number of liquid droplets of ink when marks are printed on a blank or a lens coated with a hard coating is set relatively small so that ink wets and spreads with a high wettability. On the other hand, the number of liquid droplets of ink when marks are printed on a lens coated with an antifouling coating is set relatively large so that ink adheres onto the lens surface in a dot pattern. Setting a larger number of liquid droplets of ink in this way improves the visibility and appearance quality of marks printed on a lens coated with an antifouling coating.

Again in Table 1, the resolution in the head widthwise direction means the resolution in a direction perpendicular to that in which the inkjet printer prints. This resolution is determined based on the nozzle pitch of the printhead. The nozzle pitch means the interval between a large number of nozzles aligned in a direction perpendicular to that in which the inkjet printer prints. Among the large number of nozzles, every other nozzle, for example, is used for printing, thereby halving the resolution without requiring replacement of the printhead. It is desired to change the resolution in the head widthwise direction in correspondence with the lens surface state.

Again in Table 1, the resolution in the conveyance direction means the resolution in the direction in which the inkjet printer prints. This resolution is controlled by changing the frequency at which ink is dropped from the printhead, and the movement speed (conveyance speed) of the printhead. When this resolution remains the same, reducing the number of ink particles discharged to the same adhesion point allows quick marking. On the other hand, to adhere a large number of ink particles to the same adhesion point, it is necessary to lower the marking speed.

When marks are to be printed on a lens surface having a small contact angle with ink, such as a blank or a hard coating, the resolution is set low. A lens surface coated with an antifouling coating is printed at a high resolution.

The shape of dots formed as ink particles adhered to the lens surface changes in correspondence with the printing conditions, as shown in FIGS. 15A to 15D. Referring to FIGS. 15A to 15D, reference numerals 201 denote dots formed as ink particles adhere to lenses.

Figure 15A:
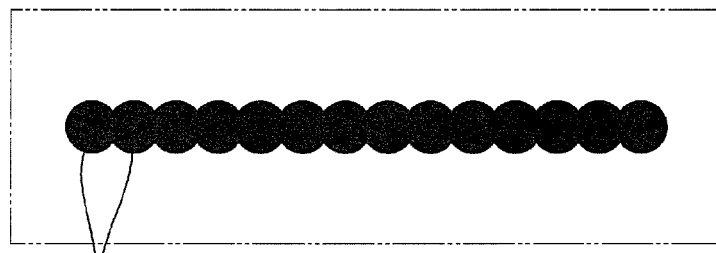
FIG. 15A is a view schematically showing how a layout mark is printed on a blank.

FIG. 15A shows a partial enlarged view of a line printed on a blank. When a blank is to be printed, lines are formed using a small amount of ink to decrease the line width (decrease the number of dots) because of its high wettability for ink (a small contact angle with ink). Adopting this marking method makes it possible to prevent traces (ghosts) from remaining after the marks are removed, and improve the mark removal performance.

Figure 15B:
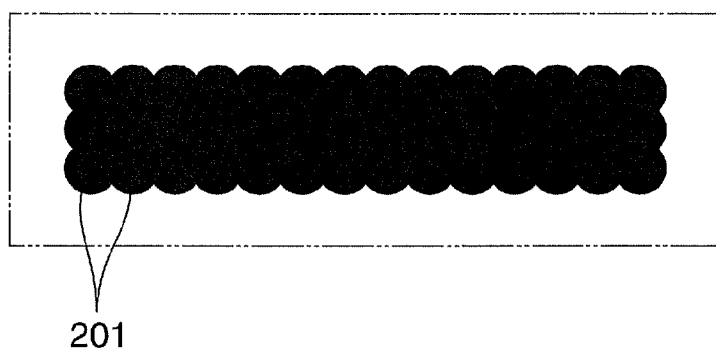
FIG. 15B is a view schematically showing how a layout mark is printed on a hard coating.

FIG. 15B shows a partial enlarged view of a line printed on a hard coating. Because a hard coating has a high wettability (a small contact angle with ink), lines are formed using a small amount of ink. The line width of a hard coating is larger than that of a blank (the number of dots is increased). Adopting this marking method makes it possible to improve the mark visibility (mark quality), and also improve the mark removal performance so as to prevent traces from remaining after the marks are removed.

Figure 15C:
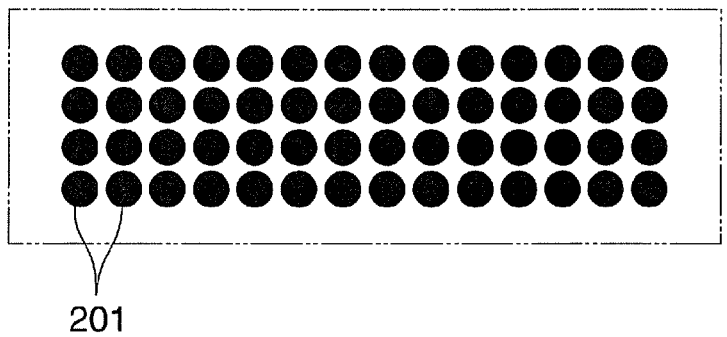
FIG. 15C is a view schematically showing how a layout mark is printed on an antifouling coating.
Figure 15D:
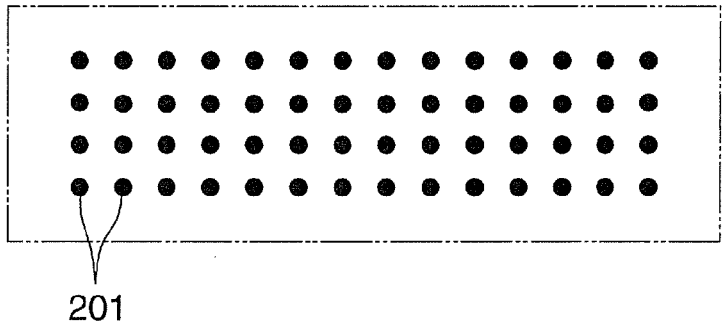
FIG. 15D is a view schematically showing how a layout mark is printed on the antifouling coating.

FIGS. 15C and 15D show partial enlarged views of lines printed on antifouling coatings. Because an antifouling coating has a low wettability for ink (a large contact angle with ink), dots are formed using ink in an amount larger than that of ink used to print marks on, for example, the blank and hard coating. The line width of the antifouling coatings is larger than those of the blank and hard coating (the number of dots is increased). Adopting this marking method improves the visibility (mark quality).

A line shown in FIG. 15D has the same width as the line shown in FIG. 15C. Also, the line shown in FIG. 15D is printed using ink in an amount smaller than that of ink used to print the line shown in FIG. 15C. A line appears relatively thin upon being printed, as shown in FIG. 15D. That is, when marks are to be printed on an antifouling coating, the mark visibility and quality can be improved by increasing the diameter of dots as much as possible within the range in which ink dots do not come into contact with each other.

(5) After determining the printing conditions using Table 1, the printing control computer H generates printing data (step S24).

A printing data generation program generates printing data sent to the control device G, based on the determined printing conditions and corresponding layout mark images. The printing data includes information such as a printing image, the amount of liquid, the conveyance speed, the line width, and the use pattern of discharge nozzles. Note that the printing conditions may be set so as to repeat printing and UV curing. In this case, the number of repetitions is desirably included in the printing data. This makes it possible to print a sharp image even when marks are printed on a coating with high water and oil repellencies.

(6) The generated printing data is sent from the printing control computer H to the control device G (step S25). The data necessary for the first image processing device C1 is sent to the controller 83 of the first image processing device C1. Also, the printing conveyance speed data is sent to the control device G.

5. Generation of Curing Condition Data

In step S5 of FIG. 6, curing condition data is generated.

The printing control computer H generates curing condition data (for example, the interval between the lens and the UV irradiation unit, the feed speed, and the UV light source ON conditions) based on the printing conditions. The generated curing condition data is sent to the control device G.

The marking apparatus 1 according to this embodiment can print a layout mark even on a photochromic lens having a surface treated with a photochromic dye. The photochromic function of a lens of this type degrades upon a strong UV curing process. Hence, the curing conditions are set upon defining as a criterion the conditions in which the function of a photochromic lens is maintained. By adopting this arrangement, the marking apparatus 1 according to this embodiment can print a layout mark on any type of lens.

6. Lens Setting

The lenses 6 are attached to the first lens holding device B1 in accordance with the following procedure (step S6).

(1) When the first image processing device C1 receives necessary data from the printing control computer H, it determines the type of lens (progressive-power lens or bifocal lens). The first image processing device C1 then sets lens position determination regions and display data of positioning marks corresponding to the type of lens, generates the display data, sets printing result determination regions, generates display data of the printing result determination regions, and stores these data in the controller 83.

(2) The CCD camera 80 and illumination device 81 are turned on while the lens table 60 stands by at the image sensing position S2. A video image of the lens table 60 is then displayed on the monitor 82, and the positioning marks, the lens position determination regions, and the type of lens are displayed on the video image.

(3) The operator designates via the touch panel 4 whether a pair of lenses 6, only a right lens 6 (one or two right lenses), or only a left lens 6 (one or two left lenses) is to be printed. Note that this setting may automatically be performed in acquiring lens information.

(4) The operator places the lenses 6 on the lens holding tables 61. The controller 83 determines in real time whether the printing reference points fall within the determination regions. If the printing reference points fall within the determination regions, "Normal" is displayed; otherwise, "Abnormal" is displayed. The controller 83 does not accept an operation of a shift to the next step is disabled until all determination results become "Normal". The operator adjusts the positions of the lenses 6 until all printing reference points are determined to fall within the determination regions.

(5) A vacuum chucking device is activated to make the lens holding tables 61 chuck and hold the lenses 6.

(6) When the lens positions are determined to be normal, the operator presses a printing start button.

7. Lens Height Measurement (1) The heights of the lenses 6(R) and 6(L) are measured (step S7).

Figure 8A:
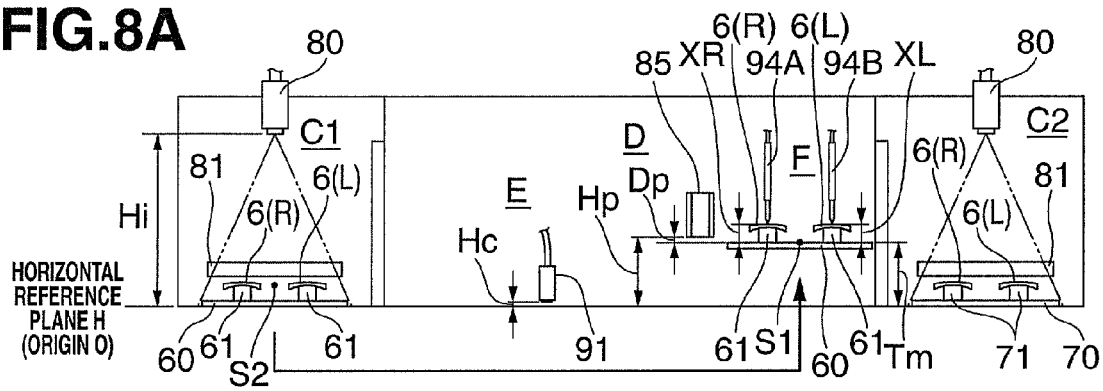
FIG. 8A is a view showing the operation sequence of a first conveyance device.

Referring to FIG. 8A, after the lens table 60 descends to a level low enough to prevent the UV irradiation portion 91 from hindering horizontal movement, it horizontally moves to the portion below the height measurement position S1. The lens table 60 then ascends to the height measurement time height Tm.

(2) When the lens table 60 ascends to the height measurement time height Tm, the centers of the upper surfaces of the lenses 6(R) and 6(L) come into contact with the probes 95 of the height gauges 94A and 94B, respectively, to push them up. The amounts of ascent of the probes 95 are measured as the heights MR and ML (see FIG. 5) of the lenses 6(R) and 6(L), respectively, and sent to the control device G.

(3) The control device G generates movement control data (control data of the horizontal movement motor 23 and lift motor 32) of the lens table 60 based on the printing data and the measurement result obtained by the height measuring device F.

8. Printing Process

Layout marks are printed on the lenses 6(R) and 6(L) using the printing device D in accordance with the following procedure (step S8).

Figure 8B:
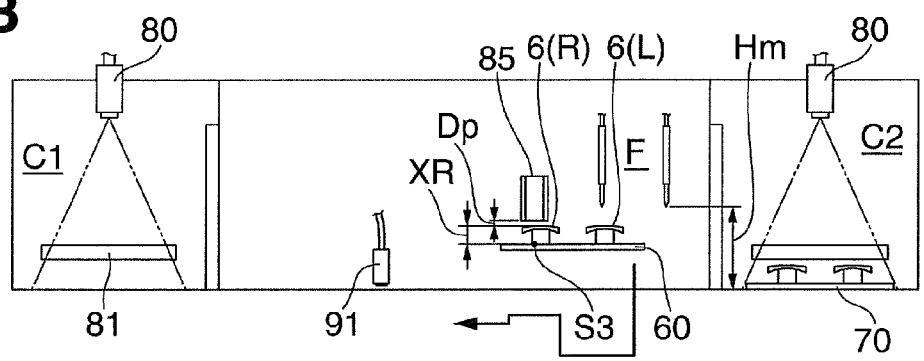
FIG. 8B is a view showing the operation sequence of the first conveyance device.
Figure 8C:
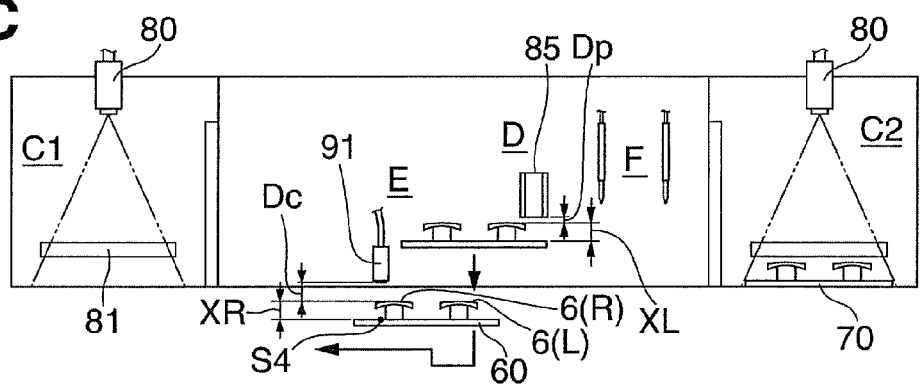
FIG. 8C is a view showing the operation sequence of the first conveyance device.

(1) After the level measurement of the lenses 6(R) and 6(L) ends, the lens table 60 descends by a required height, moves to the portion below the printing device D, ascends by a predetermined amount, and stops at a printing position S3, thereby setting the interval between the printhead 85 and the upper surface of the lens 6(R) to Dp (see FIGS. 8B and 8C).

Letting Dp be the interval between the printhead 85 and the height measurement position S1 at the time of printing, the height of the upper surface of the lens table 60 at the printing position S3 is a position Hp—Dp—XR at the time of right lens printing, and a position Hp—Dp—XL at the time of left lens printing.

When the lens table 60 ascends and stops at the printing position S3, the printhead 85 discharges ink to print a layout mark on the lens 6(R). The horizontal movement speed of the lens table 60 during printing of the lens 6(R) is determined in accordance with the printing data. When printing of a layout mark on the lens 6(R) is complete, the lens table 60 horizontally moves or slightly descends to position the lens 6(L) to the portion below the printhead 85, and ascends to a level lower than the printhead 85 by Dp (see FIG. 8C), and stops. This level position is the printing position S3 of the lens 6(L). The printhead 85 then discharges ink to print a layout mark on the lens 6(L). The horizontal movement speed of the lens table 60 during printing of the lens 6(L) is determined in accordance with the printing data.

9. Curing Process

The ink printed on the lens 6 is cured using the UV curing device E (step S9).

When printing of layout marks on the lenses 6(R) and 6(L) is complete, the lens table 60 descends by a required height, and ascends to a level position at which the interval between the UV irradiation portion 91 and the center of the upper surface of the lens 6(R) is Dc (see FIG. 8C) to pass through a curing position S4. The curing position S4 is below the UV curing device E, and the UV irradiation portion 91 irradiates the lenses 6(R) and 6(L) with UV light to cure the ink applied on the lenses 6(R) and 6(L) with UV light. The speed at which the lens table 60 passes through the curing position S4 is determined in accordance with the curing condition data.

Letting Dc (for example, 1 mm) be the interval between the UV irradiation portion 91 and the lenses 6 at the time of curing, the height of the upper surface of the lens table 60 at the curing position S4 is a position Hc-Dc-XR at the time of right lens curing, and
a position Hc-Dc-XL at the time of left lens curing.

10. Printing Result Check Process

The result of printing layout marks is checked in accordance with the following procedure (step S10).

Figure 8D:
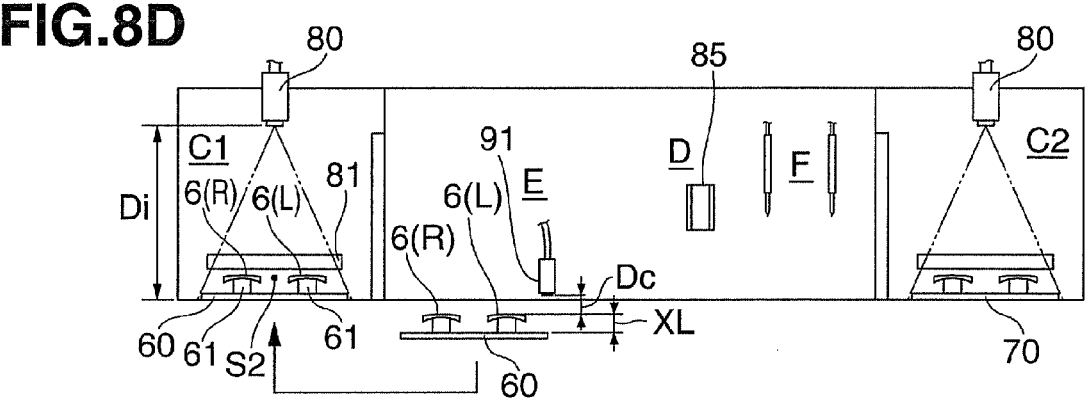
FIG. 8D is a view showing the operation sequence of the first conveyance device.
Figure 9A:
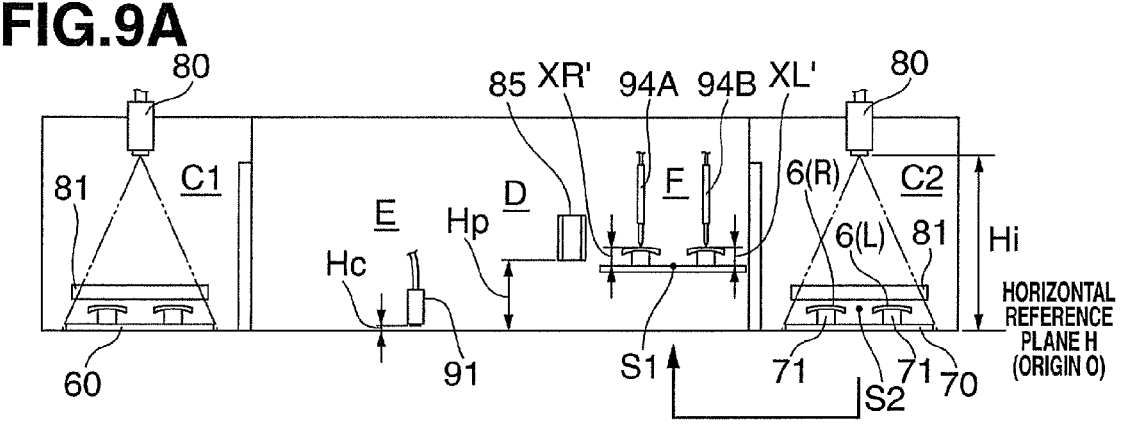
FIG. 9A is a view showing the operation sequence of a second conveyance device.
Figure 9B:
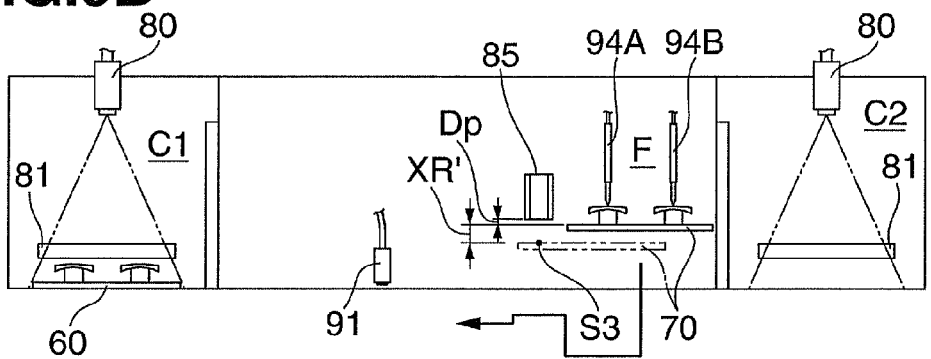
FIG. 9B is a view showing the operation sequence of the second conveyance device.
Figure 9C:
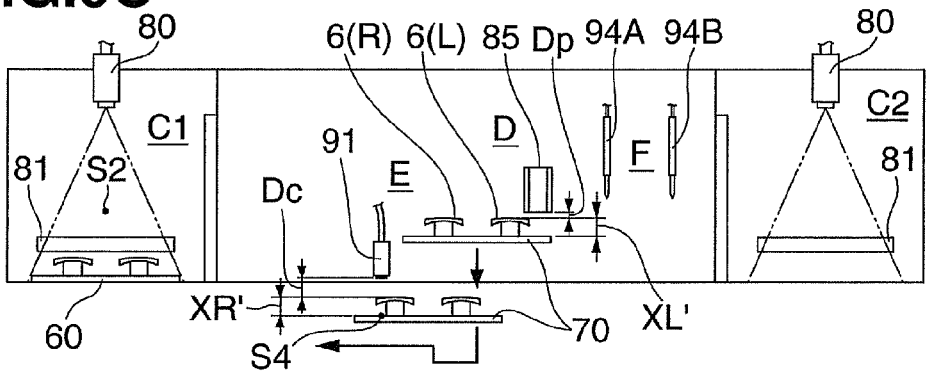
FIG. 9C is a view showing the operation sequence of the second conveyance device.
Figure 9D:
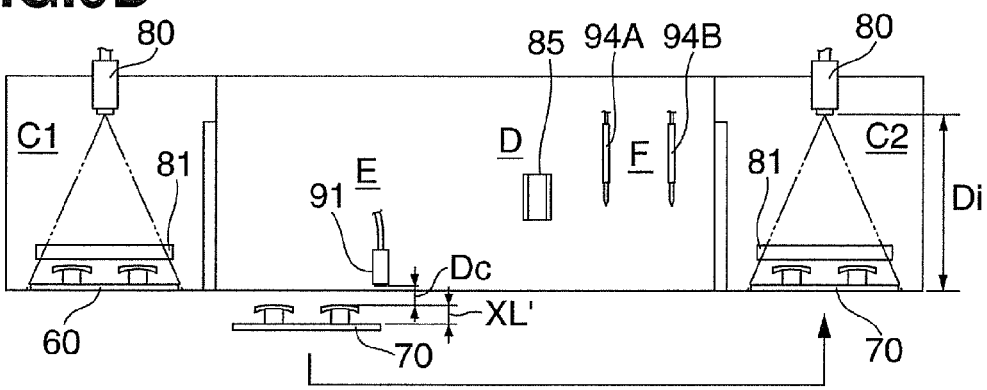
FIG. 9D is a view showing the operation sequence of the second conveyance device.

(1) After the curing process ends, the lens table 60 horizontally moves to the portion below the first image processing device C1. The lens table 60 then ascends and stops at the portion below the image sensing position S2 (FIG. 8D).

Regarding the positional relationship between the CCD camera 80 and the lens table 60 at the image sensing position S2, the CCD camera 80 is positioned on a vertical line which passes through the centers of the right and left lens setting reference positions of the lens table 60 (the central positions of the right and left lens holding tables 61). An interval Di (FIG. 8D) between the CCD camera 80 and the lens table 60 is set shch that the image sensing area of the CCD camera 80 has a predetermined size (for example, the distance (150 mm) between the centers of the right and left lens holding tables 61 becomes 1,100 pixels). The height of the lens table 60 at this time corresponds to a position Hi-Di. Note that the height of the lens table 60 at the time of image sensing is preferably set higher than the height position of the UV irradiation portion 91 so as to prevent light from the UV irradiation portion 91 entering the image sensing position.

(2) The CCD camera 80 and illumination device 81 are turned on to sense images of the lenses 6 set on the lens table 60, and a video image which bears the information of the sensed images is displayed on the monitor 82. The monitor 82 displays on the video image the positioning marks, the lens position determination regions, the type of lens, the mark position determination regions, and the mark detail determination regions.

(3) The controller 83 determines whether the printing reference points fall within the lens position determination regions and whether the marks fall within the mark position determination regions, and displays the determination results on the monitor 82. Also, the marks displayed in the mark detail determination regions are compared with design marks by pattern matching to determine whether printed marks are present and whether the details have errors, and the determination results are displayed on the monitor 82.

(4) If either of the determination results has an error, an error message is displayed to prompt the operator to confirm the operation done by himself or herself.

11. Lens Removal

The operator presses a lens removal button. The control device G operates the valve of the vacuum chucking device to break the vacuum of the lens holding tables 61, thereby canceling the state in which the lens 6 is chucked and held. The operator removes the lenses 6 from the marking apparatus 1, places them on the tray, and transfers them to the next process (step S11).

FIGS. 9A to 9D are views showing the operation sequence of the second conveyance device A2.

The operation sequence of the second conveyance device A2 is exactly the same as the operation sequence of the first conveyance device A1 mentioned above, and a description thereof will not be given. The lenses 6 conveyed by the second conveyance device A2 are different from the lenses 6 conveyed by the first conveyance device A1, so their heights are set to R' and XL'.

In this manner, since the marking apparatus 1 according to this embodiment alternately, repeatedly, continuously perform two types of marking processes, the marking processes can efficiently be performed, thus improving the productivity. Also, since the printing device D, UV curing device E, and height measuring device F are shared, the number of components can be reduced, thus making the apparatus simpler and less expensive.

A marking apparatus capable of alternately repeating two types of marking processes as described above is represented in the form of the scope of claims as follows.

A marking apparatus for spectacle lenses, which prints a layout mark on the optical surface of a spectacle lens, comprises:

a lens holding device which holds the spectacle lens;
a conveyance device which moves the lens holding device horizontally and vertically;
an image processing device which senses and processes an image of the spectacle lens;
a height measuring device which measures the height of the spectacle lens;
a printing device implemented by an inkjet printer which prints the layout mark on the spectacle lens; and
a UV curing device which cures the ink printed on the spectacle lens,
the lens holding device including a first lens holding device and a second lens holding device capable of holding a pair of spectacle lenses, respectively,
the image processing device including a first image processing device and a second image processing device, and
the conveyance device including a first conveyance device which liftably holds the first lens holding device and reciprocally moves among the first image processing device, the height measuring device, the printing device, and the UV curing device, and a second conveyance device which liftably holds the second lens holding device, and reciprocally moves among the second image processing device, the height measuring device, the printing device, and the UV curing device.

The marking apparatus for spectacle lenses, configured as described above, adopts a first marking process mode in which the spectacle lens held by the first lens holding device is processed by the first image processing device, height measuring device, printing device, and UV curing device, and a second marking process mode in which the spectacle lens held by the second lens holding device is processed by the second image processing device, height measuring device, printing device, and UV curing device, and alternately repeats these process modes to efficiently perform marking, thus improving the productivity.

Also, since the printing device and UV curing device are shared in the marking processes for the spectacle lenses held by the first and second lens holding devices, the apparatus can be simplified.

Figure 10:
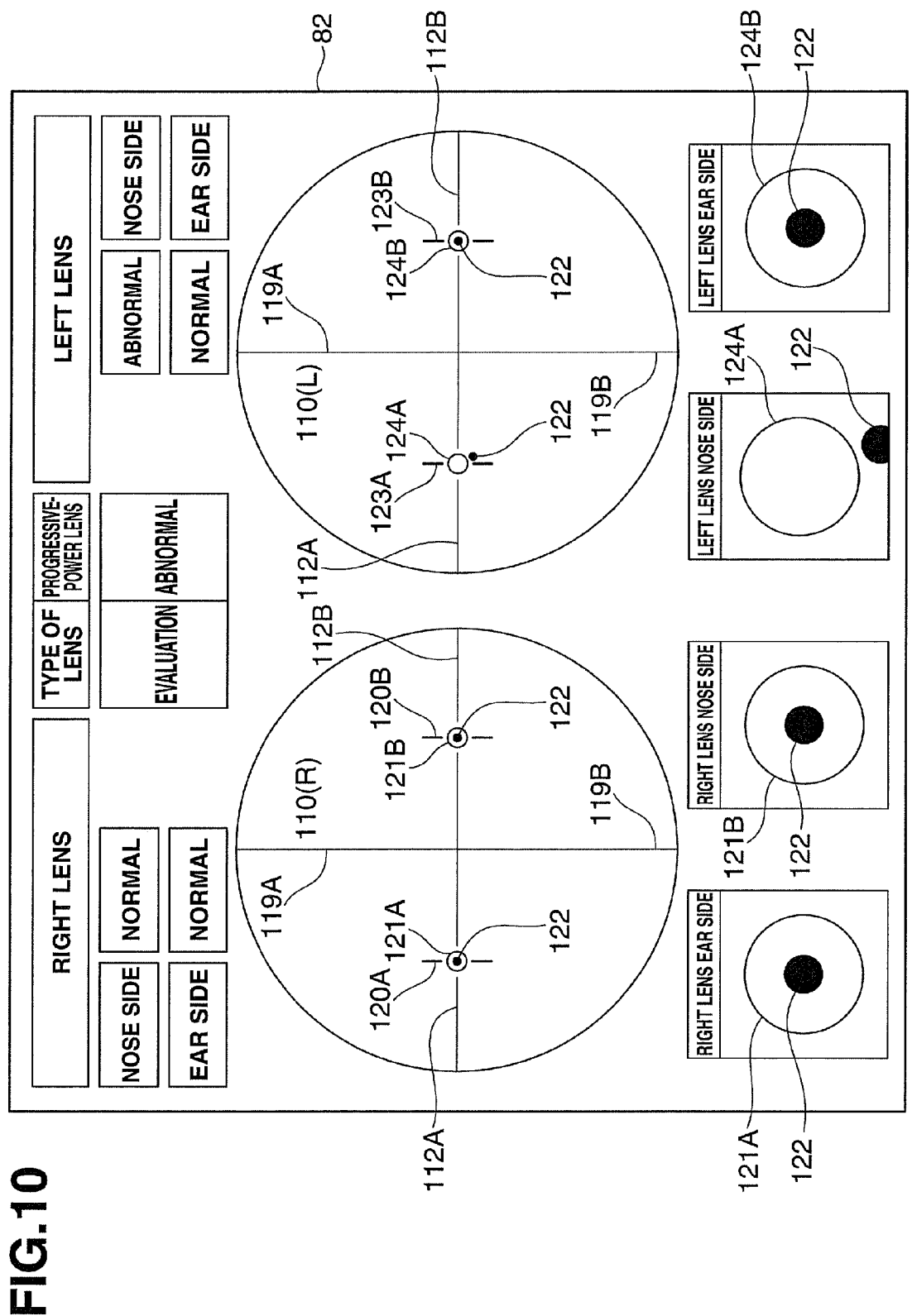
FIG. 10 is a view showing a display screen at the time of alignment by an image processing device for a progressive-power lens.

FIG. 10 is a view showing a display screen at the time of alignment by the first image processing device C1 for a progressive-power lens 110. Note that the same reference numerals as in FIG. 16 denote the same indication marks in FIG. 10, and a description thereof will not be given. Reference numeral 120A denotes a right lens ear-side vertical positioning line; 120B, a right lens nose-side vertical positioning line; 121A, a right lens ear-side determination region; 121B, a right lens nose-side determination region; 122, printing reference point images; 123A, a left lens ear-side vertical positioning line; 123B, a left lens nose-side vertical positioning line; 124A, a left lens ear-side determination region; and 124B, a left lens nose-side determination region.

In a lens 110(R), the printing reference point images 122 fall within the right lens ear-side determination region 121A and right lens nose-side determination region 121B. On the other hand, in a lens 110(L), the printing reference point image 122 falls outside the left lens ear-side determination region 124A, while it falls within the left lens ear-side determination region 124B. Hence, the determination result is displayed as abnormal.

Figure 11:
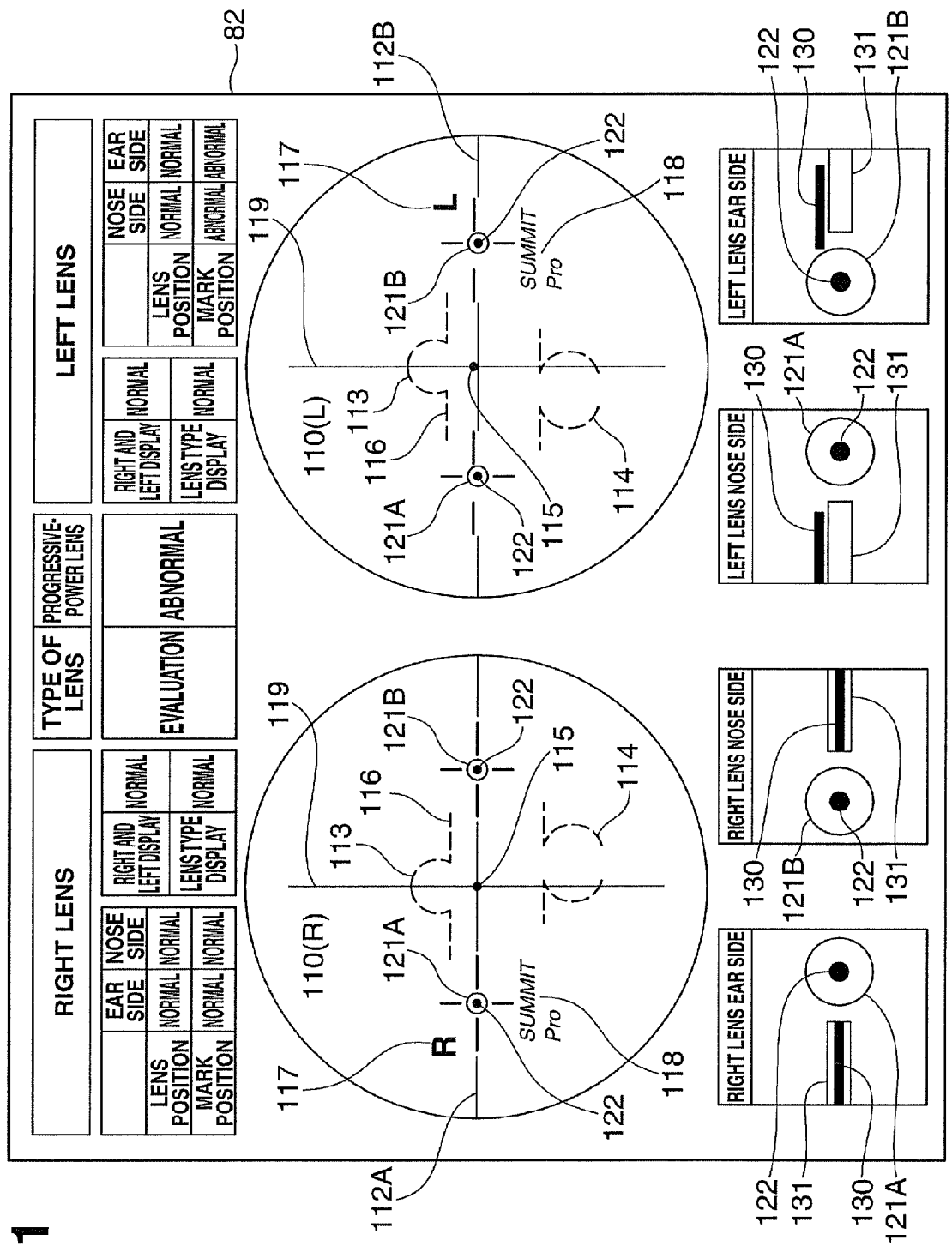
FIG. 11 is a view showing a display screen at the time of a printing result check by the image processing device for the progressive-power lens.

FIG. 11 is a view showing a display screen at the time of a printing result check by the first image processing device C1 for the progressive-power lens 110 as well. The same reference numerals as in FIG. 16 denote the same indication marks in FIG. 11, and a description thereof will not be given. Reference numerals 130 denote layout images; and 131, mark position determination regions. In the lens 110(R), the layout images 130 fall within the ear- and nose-side mark position determination regions 131. Hence, the lens 110(R) is determined as normal. On the other hand, in the lens 110(L), the layout images 130 fall outside the ear- and nose-side mark position determination regions 131. Hence, the lens 110(L) is determined as abnormal.

Figure 12:
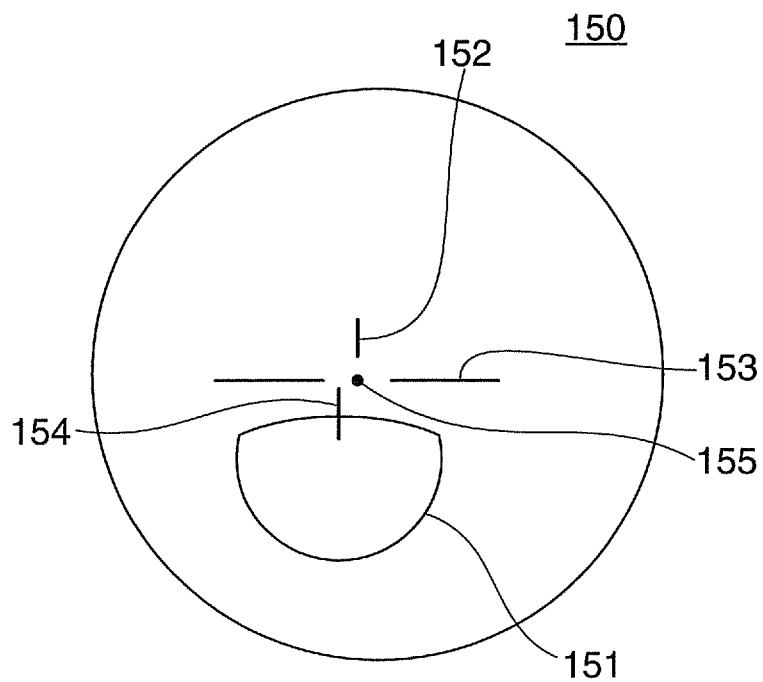
FIG. 12 is a view illustrating an example of a layout mark printed on a bifocal lens.
Figure 16:
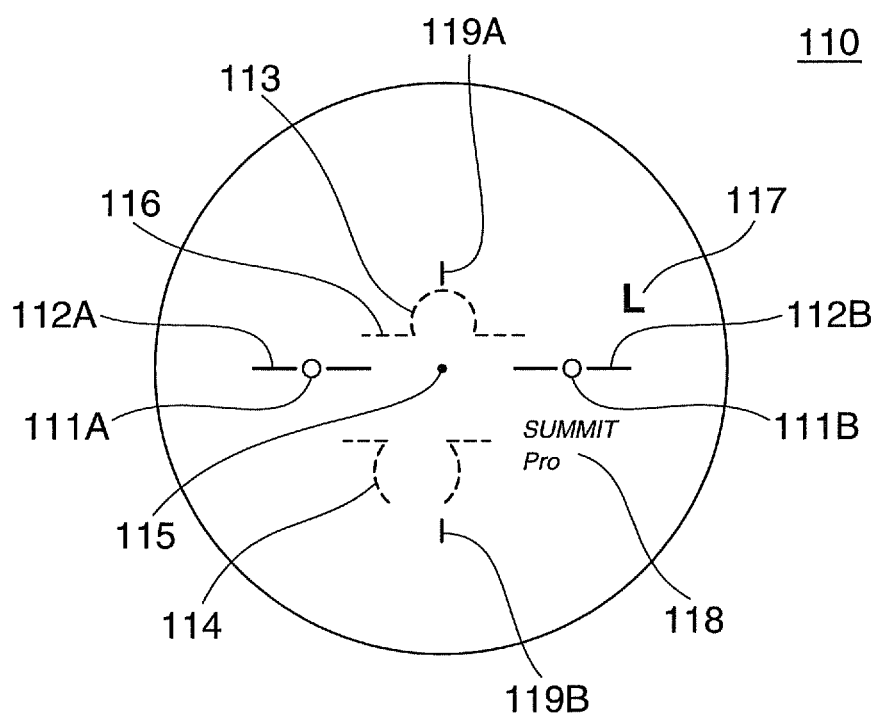
FIG. 16 is a view illustrating an example of a layout mark on a progressive-power lens.

Although an example in which layout marks are printed on the progressive-power lens 110 shown in FIG. 16 has been explained in the above-mentioned embodiment, the present invention is not limited to this, and layout marks can be printed on a bifocal lens shown in FIG. 12 as well.

Referring to FIG. 12, reference numeral 150 denotes a bifocal lens; 151, a segment; 152, a distance portion vertical reference line; 153, a distance portion horizontal reference line; 154, a near portion vertical reference line; and 155, a distance portion optical center 155.

Figure 13:
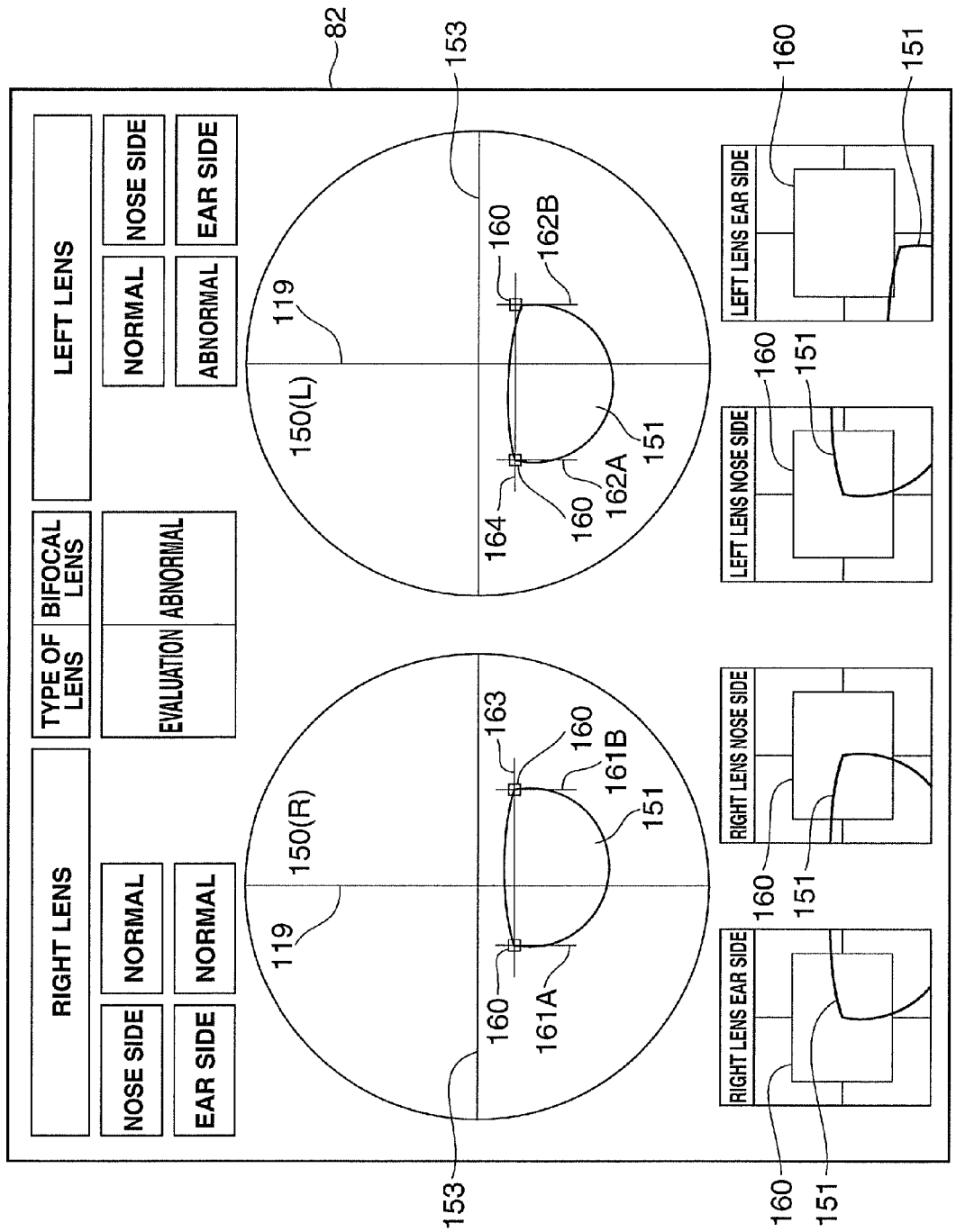
FIG. 13 is a view showing a display screen at the time of alignment by the image processing device for a bifocal lens.

FIG. 13 is a view showing a display screen at the time of alignment by the image processing device C for the bifocal lens 150. Reference numerals 160 denote printing reference regions; 161A and 161B, right lens ear- and nose-side vertical positioning lines; 162A and 162B, left lens ear- and nose-side vertical positioning lines; 163 and 164, right lens and left lens horizontal positioning lines.

In a lens 150(R), the nose- and ear-side corner portions of the segment 151 fall within the printing reference regions 160. Hence, the lens 150(R) is determined as normal. On the other hand, in a lens 150(L), the nose-side corner portion of the segment 151 falls within the printing reference region 160, while the ear-side corner portion of the segment 151 falls outside the printing reference region 160. Hence, the lens 150(L) is determined as abnormal.

Figure 14:
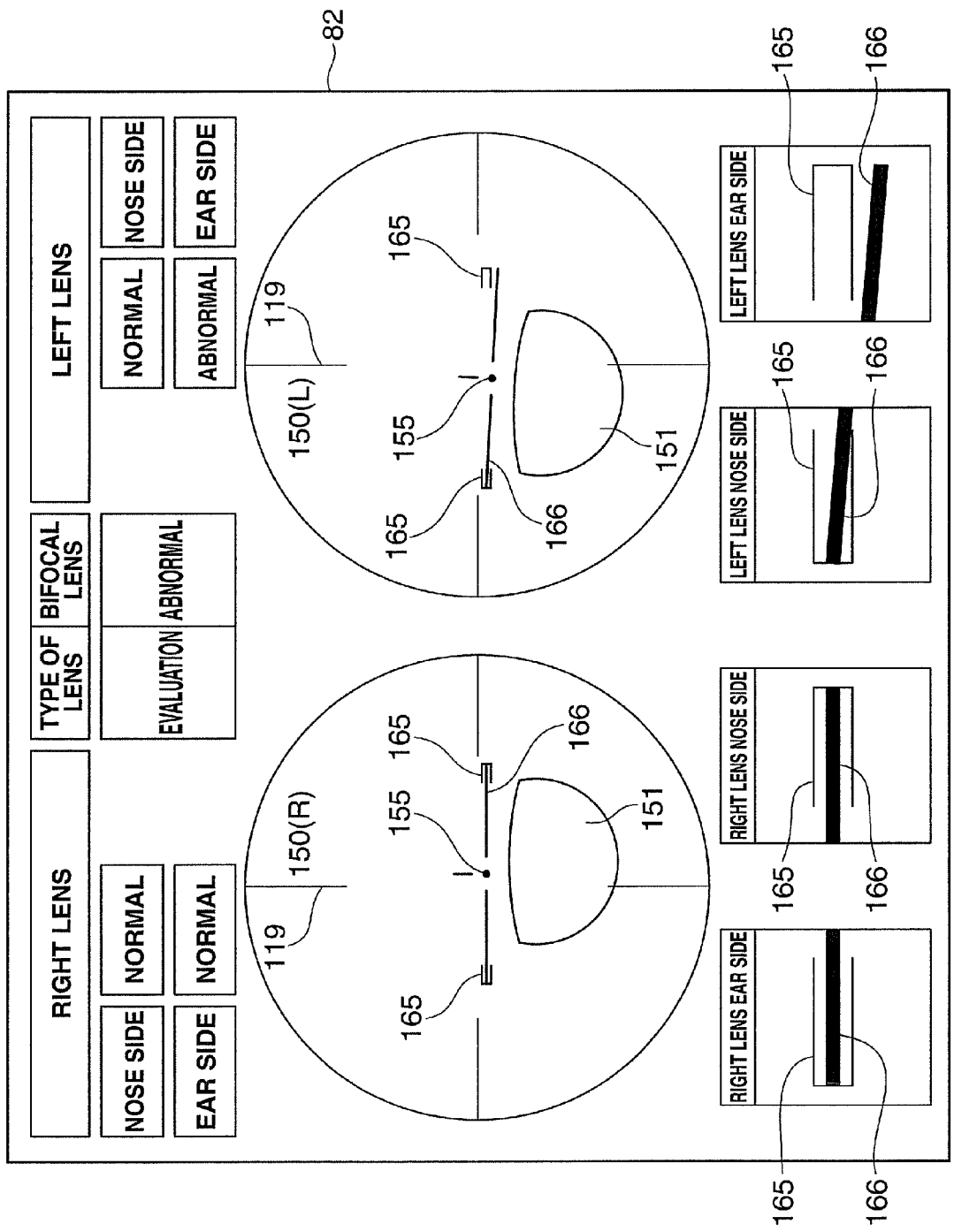
FIG. 14 is a view showing a display screen at the time of a printing result check by the image processing device for the bifocal lens.

FIG. 14 is a view showing a display screen at the time of a printing result check by the first image processing device C1 for the bifocal lens 150 as well.

In the lens 150(R), the layout mark images 166 fall within the nose- and ear-side mark position determination regions 165. Hence, the lens 150(R) is determined as normal. On the other hand, in the lens 150(L), the layout mark image 166 falls within the nose-side mark position determination region 165, while the other layout mark image 166 falls outside the ear-side mark position determination region 165. Hence, the lens 150(L) is determined as abnormal.

Explanation of the Reference Numerals and Signs

1 . . . marking apparatus, 2 . . . housing, 6 . . . lens, 19 . . . horizontal movement mechanism, 20 . . . lift mechanism, 60, 70 . . . lens tables, 61, 71 . . . lens holding tables, A . . . conveyance device, A1 . . . first conveyance device, A2 . . . second conveyance device, B . . . lens holding device, B1 . . . first lens holding device, B2 . . . second lens holding device, C . . . image processing device, C1 . . . first image processing device, C2 . . . second image processing device, D . . . printing device, E . . . UV curing device, F . . . height measuring device, G . . . control device (PLC), H . . . printing control computer, J . . . input means.

The invention claimed is:

1. A marking apparatus for spectacle lenses, comprising:
a lens holding device which holds a spectacle lens;
a conveyance device which moves said lens holding device horizontally and vertically;
an image processing device which senses and processes an image of the spectacle lens;
a height measuring device which measures a height of the spectacle lens;
a printing data generation device which generates printing data of a layout mark to be printed on an optical surface of the spectacle lens;
a printing device implemented by an inkjet printer which prints the layout mark on the spectacle lens in cooperation with said conveyance device based on the printing data; and
a UV curing device which cures the ink printed on the spectacle lens,
said printing data generation device including
a storage unit which stores image data of the layout mark, and printing condition data including a plurality of printing conditions each corresponding to a surface state of the spectacle lens, and
a process unit which generates the printing data based on the image data and a printing condition selected from the plurality of printing conditions.

2. A marking apparatus for spectacle lenses according to claim 1, wherein
the surface state of the spectacle lens is specified by at least one of a wettability for ink and a fixability of ink,
as the printing condition, at least one of a line width of the layout mark, an amount of liquid of one ink particle discharged from the inkjet printer, and a resolution of a dot formed by the ink particle adhered to the spectacle lens is set so as to change depending on the surface state,
the higher the at least one of the wettability and the fixability, the larger the set line width of the layout mark becomes,
the higher the at least one of the wettability and the fixability becomes higher, the smaller the set amount of liquid becomes, and
the higher the at least one of the wettability and the fixability, the higher the set resolution becomes.

3. A marking apparatus for spectacle lenses according to claim 1, wherein
the spectacle lens includes a photochromic lens dyed with a photochromic dye,
said UV curing device cures the ink based on a curing condition determined in advance, and
the curing condition is set upon defining as a criterion a condition in which a function of the photochromic lens is maintained.

4. A marking apparatus for spectacle lenses according to claim 1, wherein
said image processing device includes
a function of detecting by image processing a printing reference point provided on the spectacle lens so that the printing reference point can be sensed by a camera,
a function of determining whether the printing reference point falls within a tolerance determined in advance, and
a function of inhibiting a shift to the next process when the printing reference point falls outside the tolerance.

5. A marking apparatus for spectacle lenses according to claim 4, wherein the printing reference point includes a printing point formed on a horizontal reference mark of a hidden mark in advance so that the printing point can be observed visually.

6. A marking apparatus for spectacle lenses according to claim 1, wherein said image processing apparatus includes
a function of detecting by image processing the layout mark printed on the spectacle lens, and
a function of comparing the printed layout mark with the image data by pattern matching to determine whether the printed layout mark is correct.

7. A method of printing layout marks on spectacle lenses, comprising:
holding a spectacle lens;
inputting a surface state of a printing surface of the spectacle lens;
selecting a printing condition suitable for the spectacle lens to be printed among a plurality of printing conditions, each of which is set in correspondence with the surface state; and
printing a layout mark on the spectacle lens by using an inkjet printer in accordance with the selected printing condition, wherein
as the printing condition, at least one of a line width of the layout mark, an amount of liquid of one ink particle discharged from the inkjet printer, and a resolution of a dot formed by the ink particle adhered to the spectacle lens is set so as to change depending on the surface state.

8. A method of printing layout marks on spectacle lenses according to claim 7, wherein
the surface state is specified by at least one of a wettability for ink and a fixability of ink,
the higher the one of the wettability and the fixability is, the thinner the set line width of the layout mark becomes,
the higher the one of the wettability and the fixability is, the smaller the set amount of liquid becomes, and
the higher the one of the wettability and the fixability is, the lower the set resolution becomes.

9. A method of manufacturing spectacle lenses, comprising:
holding a spectacle lens;
inputting a surface state of a printing surface of the spectacle lens;
selecting a printing condition suitable for the spectacle lens to be printed among a plurality of printing conditions, each of which is set in correspondence with the surface state; and
printing a layout mark on the spectacle lens by using an inkjet printer in accordance with the selected printing condition, wherein
as the printing condition, at least one of a line width of the layout mark, an amount of liquid of one ink particle discharged from the inkjet printer, and a resolution of a dot formed by the ink particle adhered to the spectacle lens is set so as to change depending on the surface state.

10. A method of manufacturing spectacle lenses according to claim 9, wherein
the surface state is specified by at least one of a wettability for ink and a fixability of ink,
the higher the one of the wettability and the fixability is, the thinner the set line width of the layout mark becomes,
the higher the one of the wettability and the fixability is, the smaller the set amount of liquid becomes, and
the higher the one of the wettability and the fixability is, the lower the set resolution becomes.

11. A method of manufacturing spectacle lenses according to claim 9, further comprising:
transferring the spectacle lens to a holding position, and curing the layout mark printed on the spectacle lens.

* * * * *